L. R. WINSLOW.
VOTING MACHINE.
APPLICATION FILED FEB. 5, 1904.
966,148.
Patented Aug. 2, 1910.
21 SHEETS—SHEET 9.
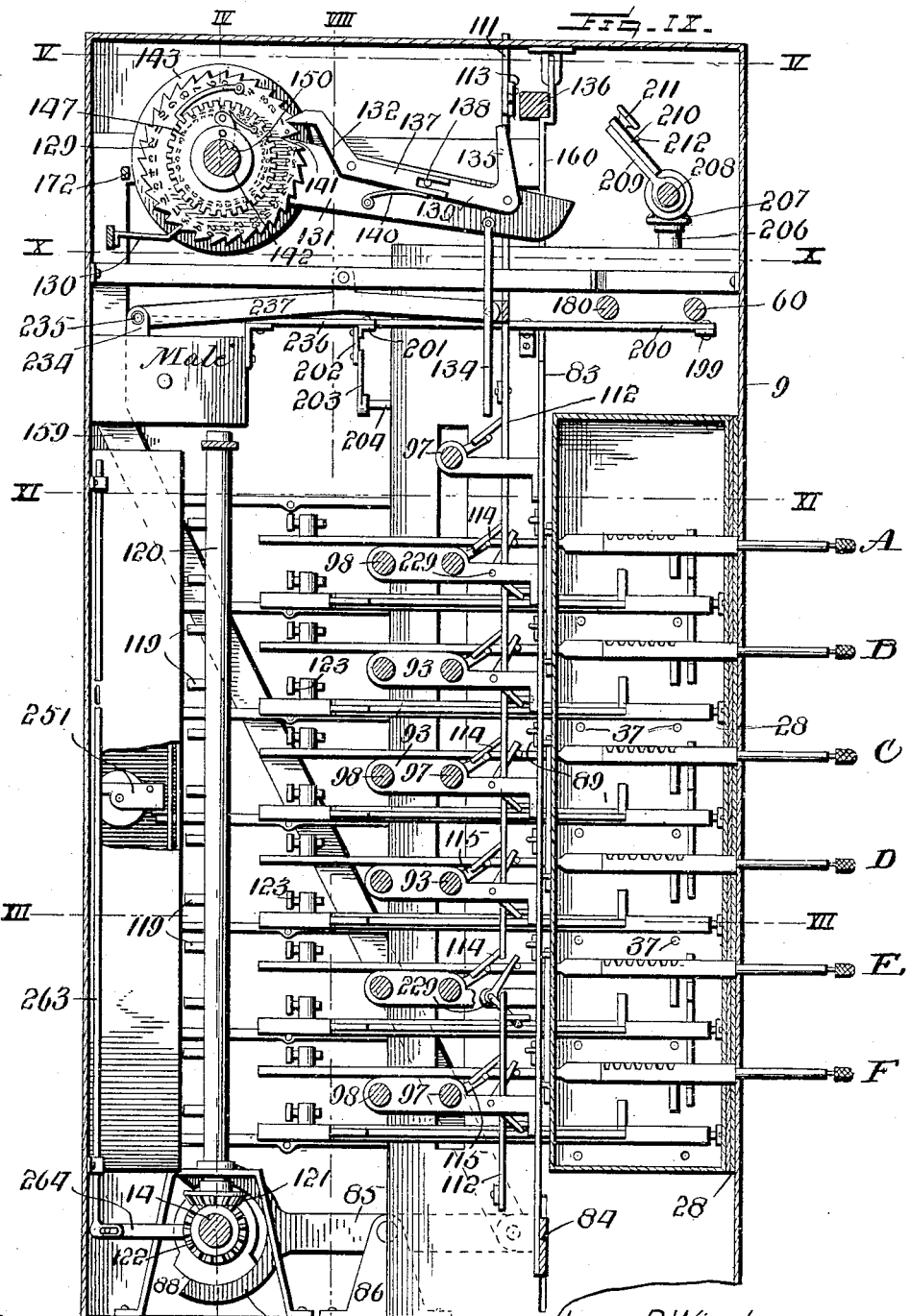

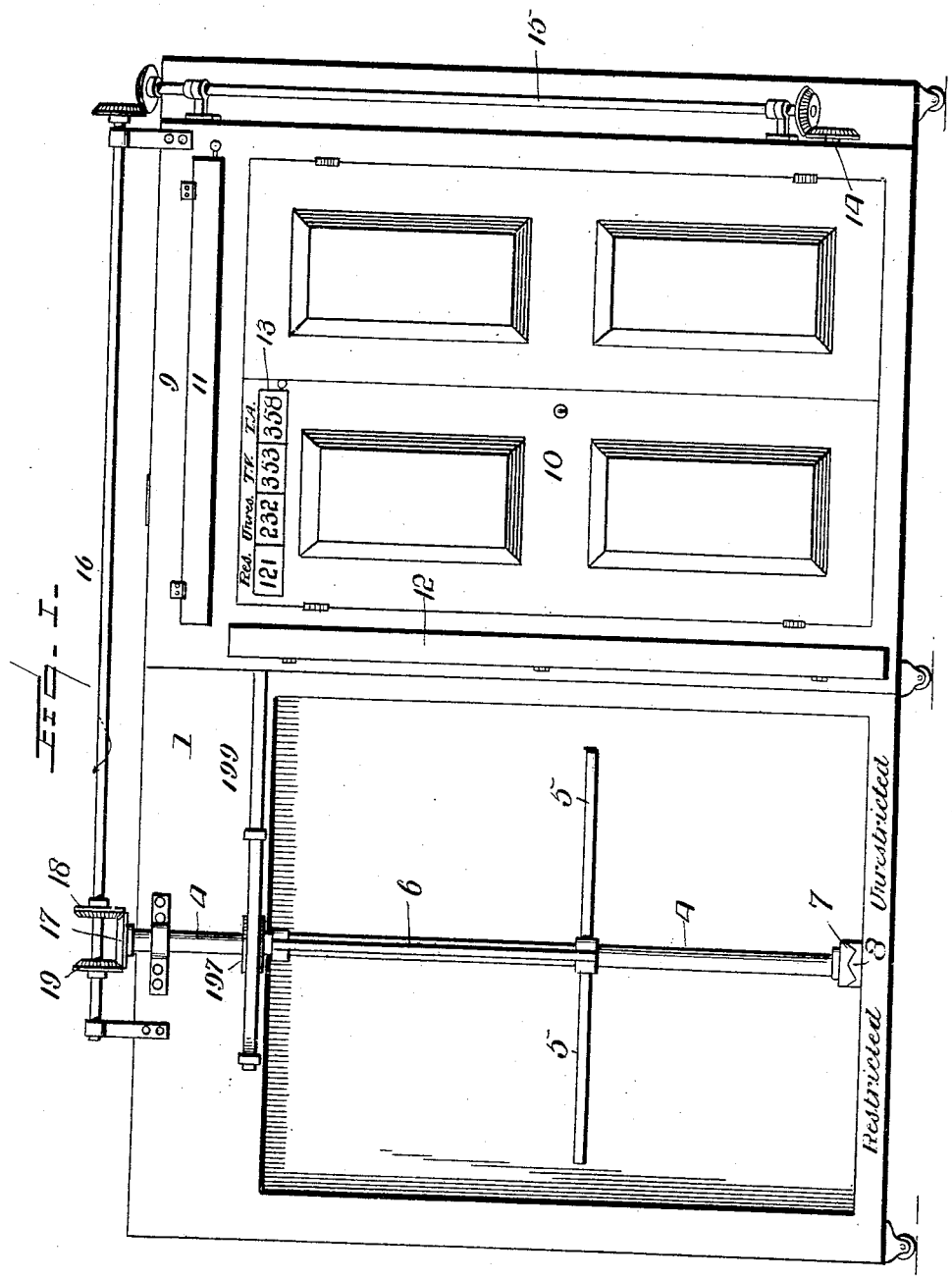

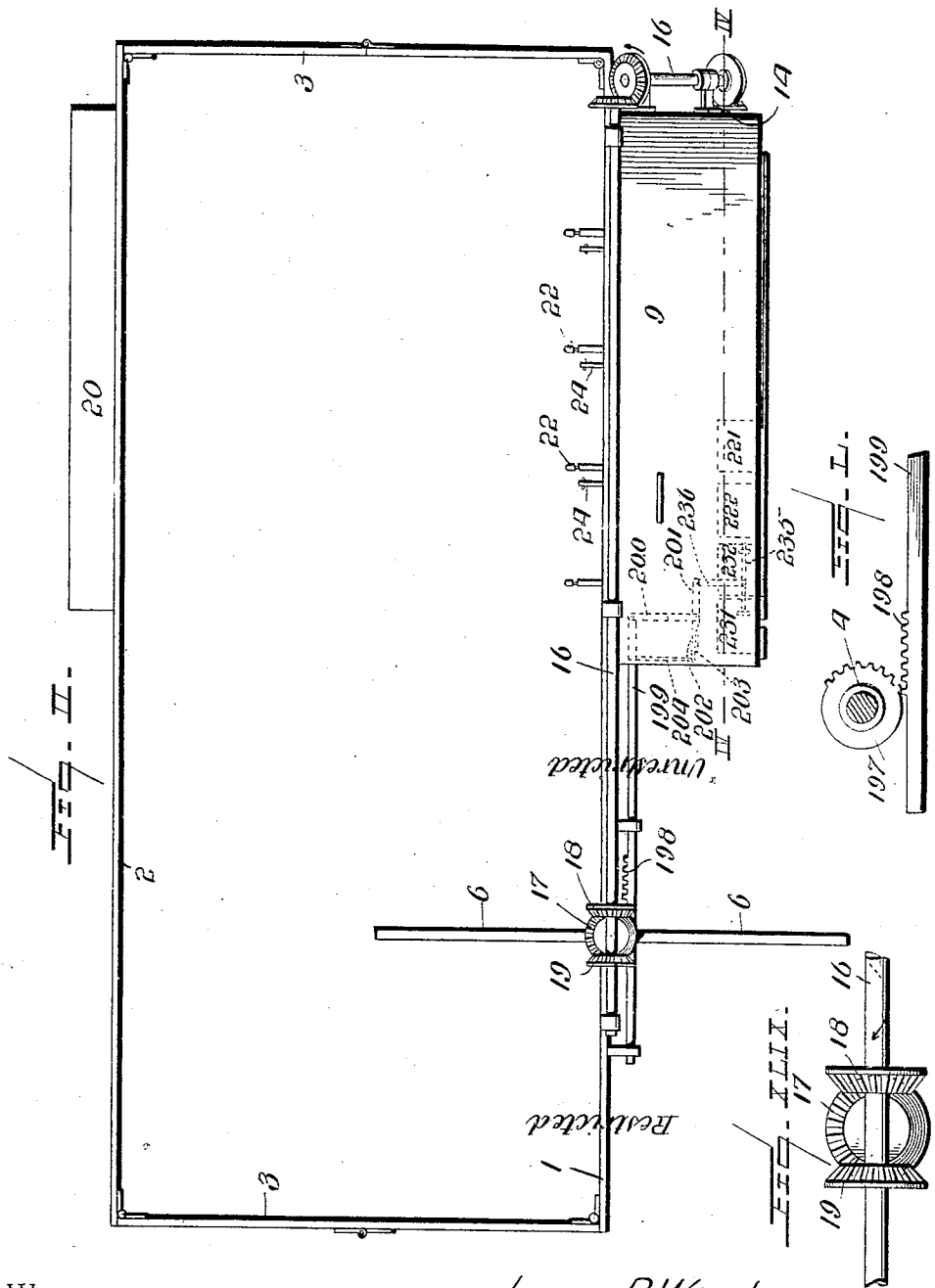

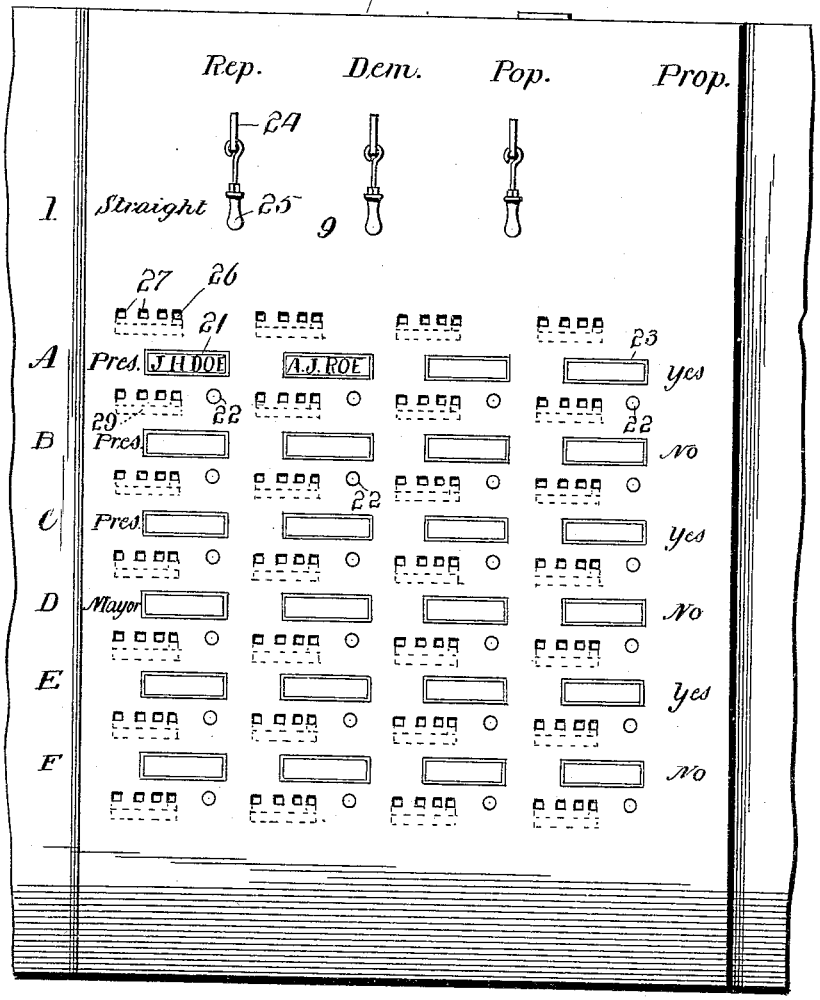
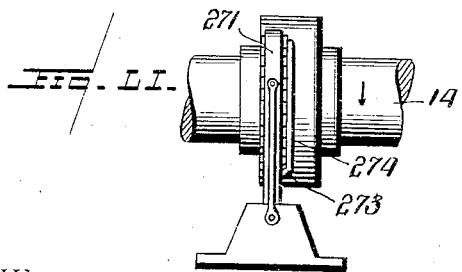
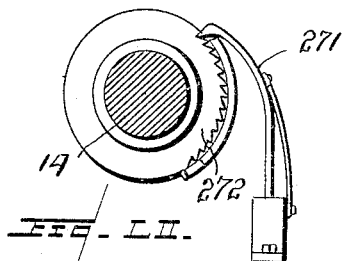

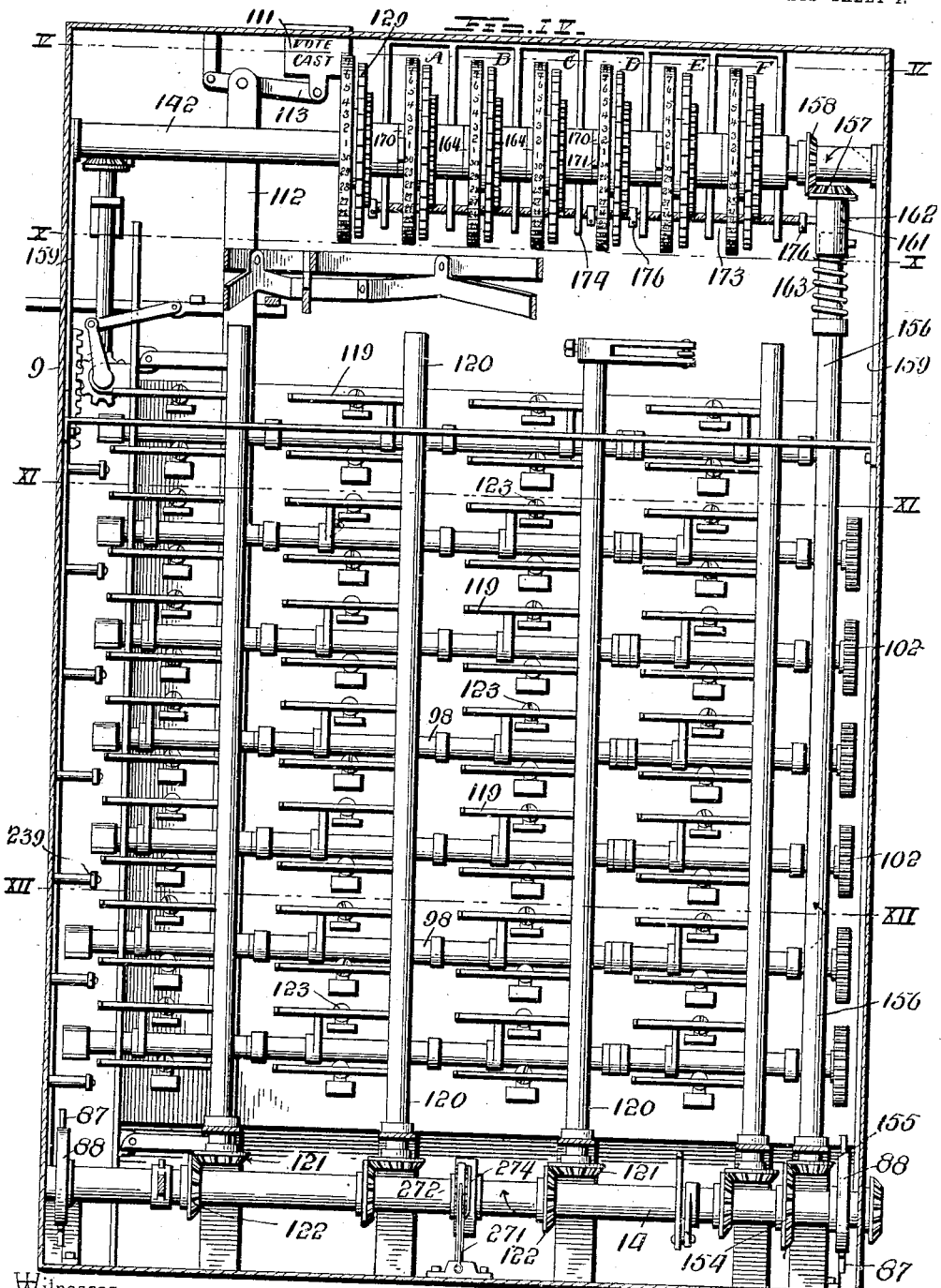

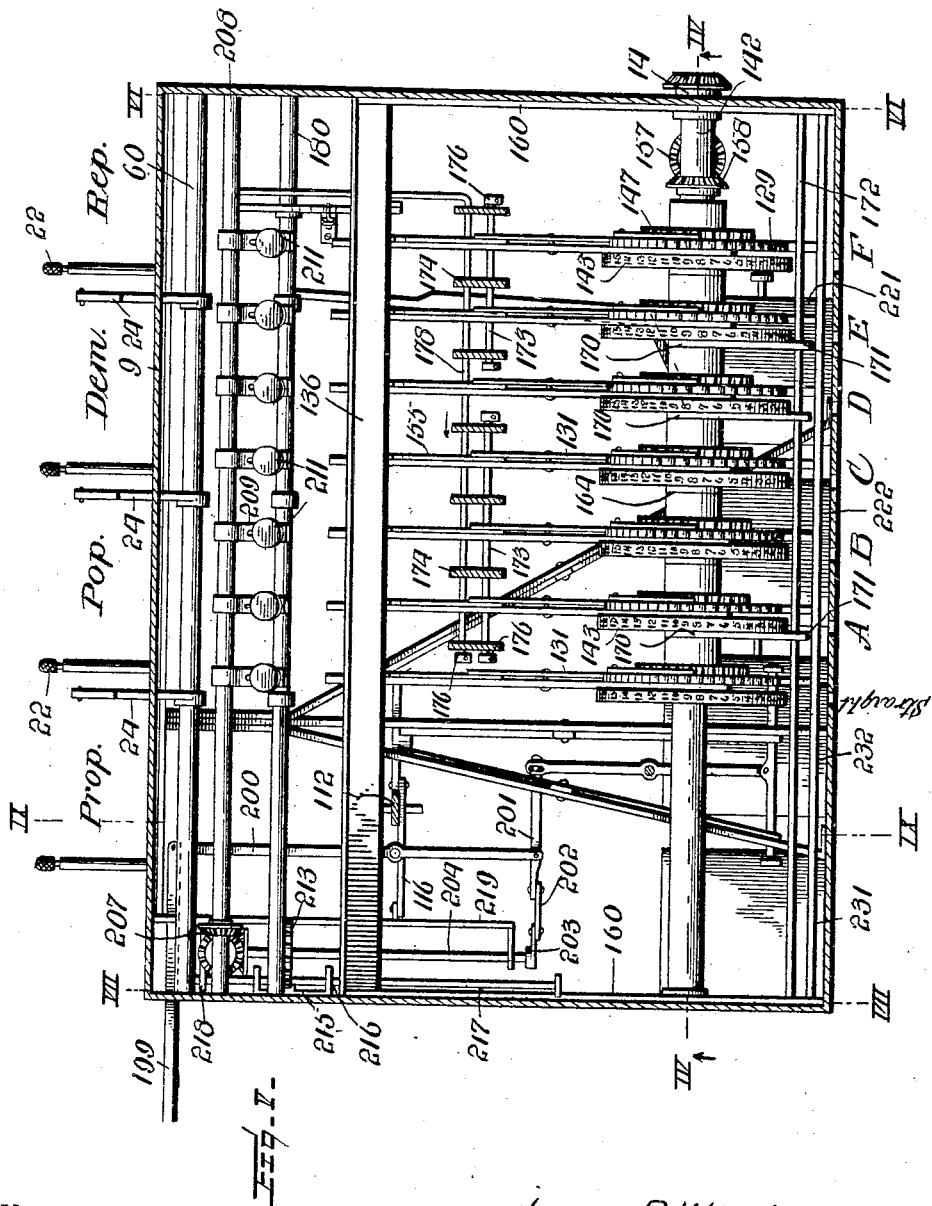

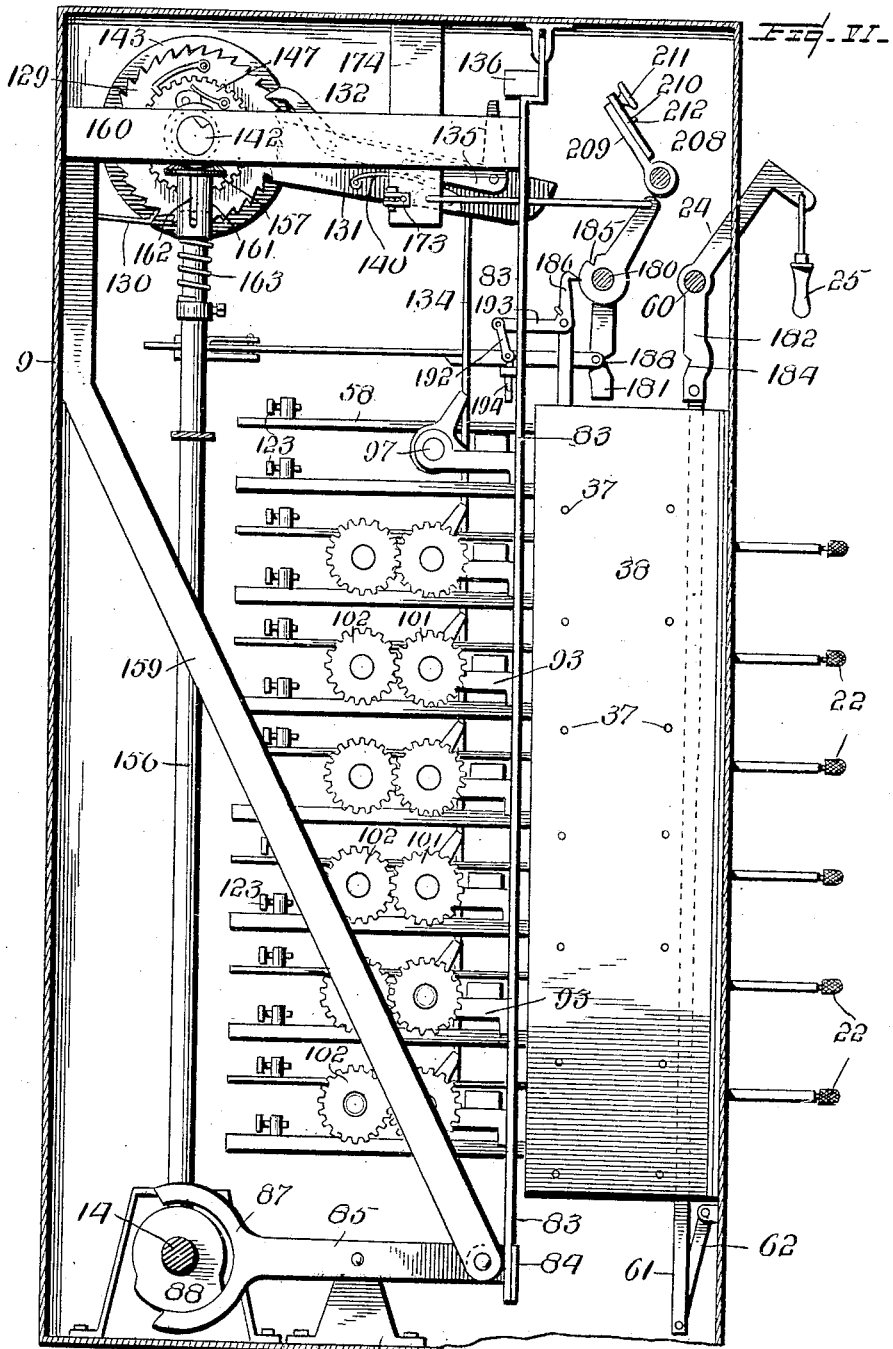

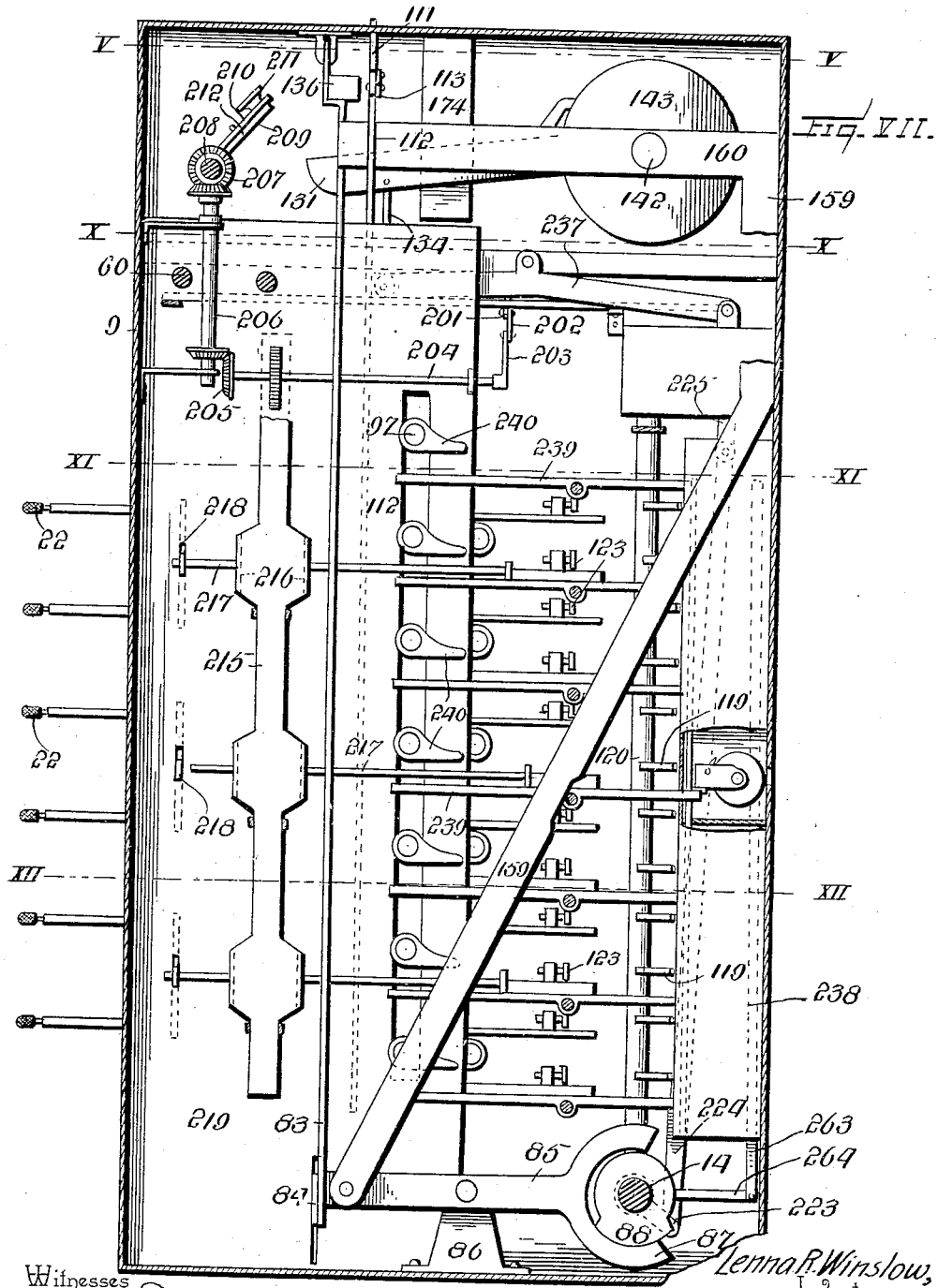

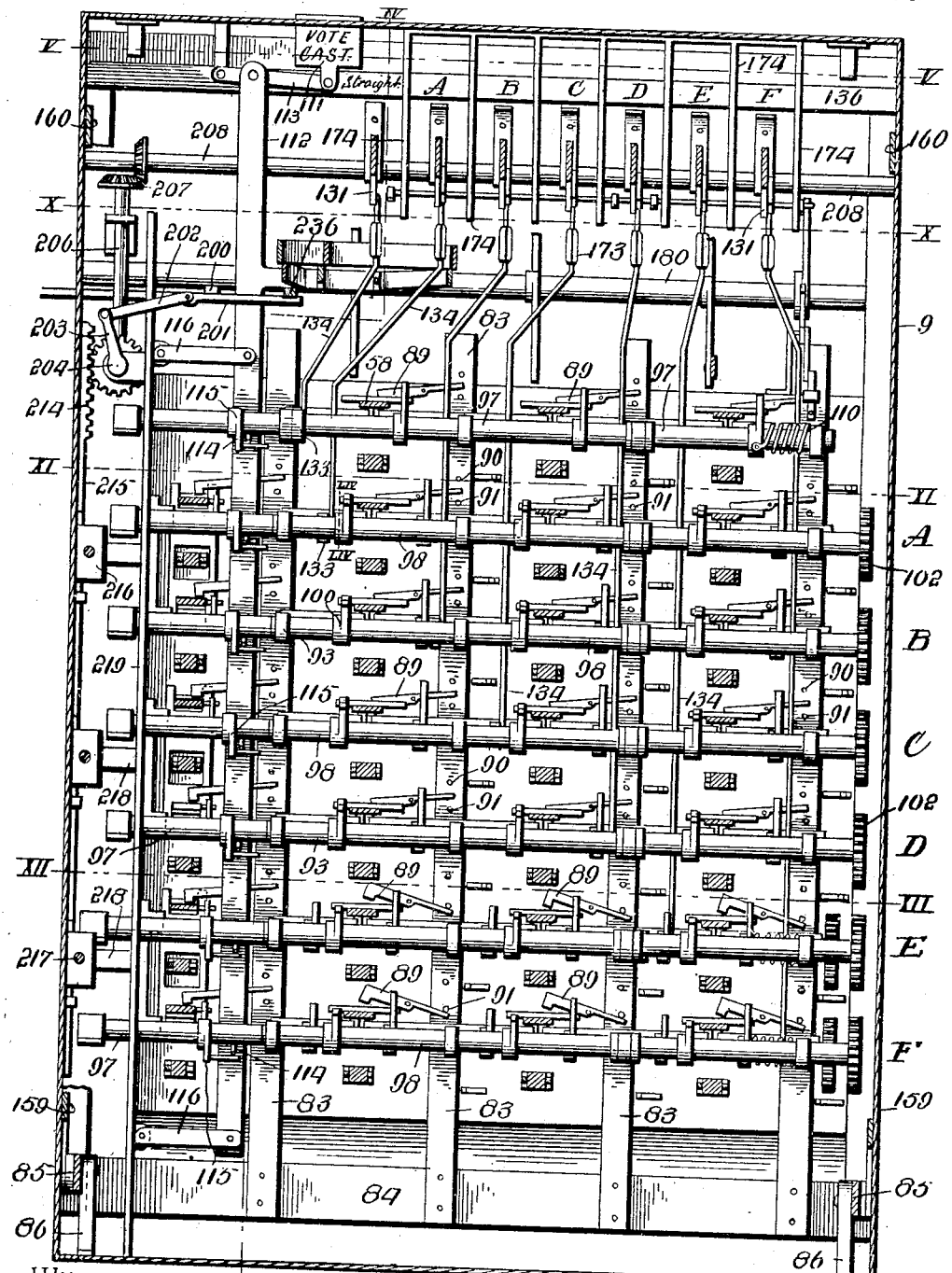

L. R. WINSLOW.
VOTING MACHINE.
APPLICATION FILED FEB. 5, 1904.
966,148.
Patented Aug. 2, 1910.
21 SHEETS—SHEET 10.
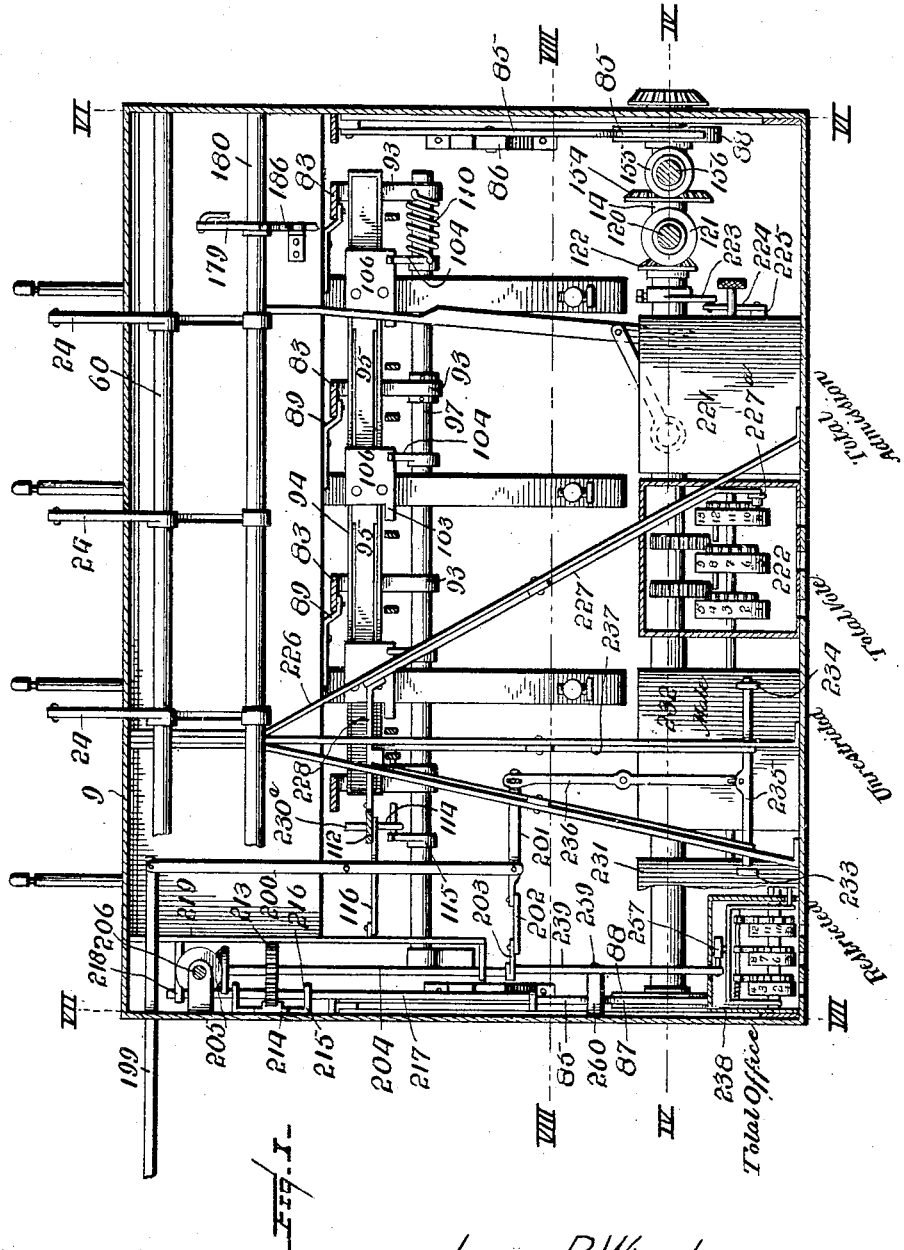
Witnesses
W. F. Doyle
Lenna R. Winslow, Inventor;
by C. A. Snow & Co.
Attorneys L. R. WINSLOW.
VOTING MACHINE.
APPLICATION FILED FEB. 5, 1904.
966,148.
Patented Aug. 2, 1910.
21 SHEETS—SHEET 11.
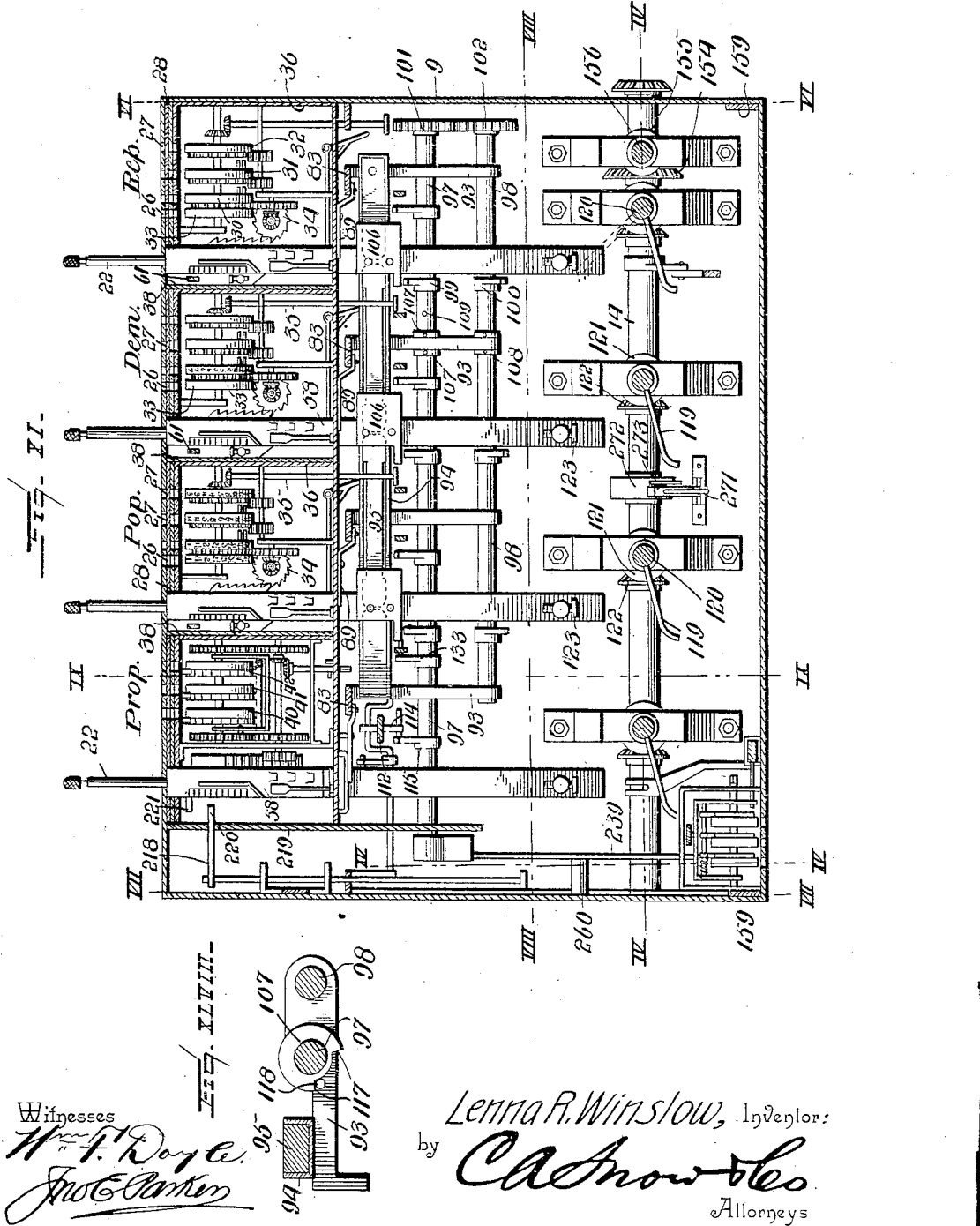

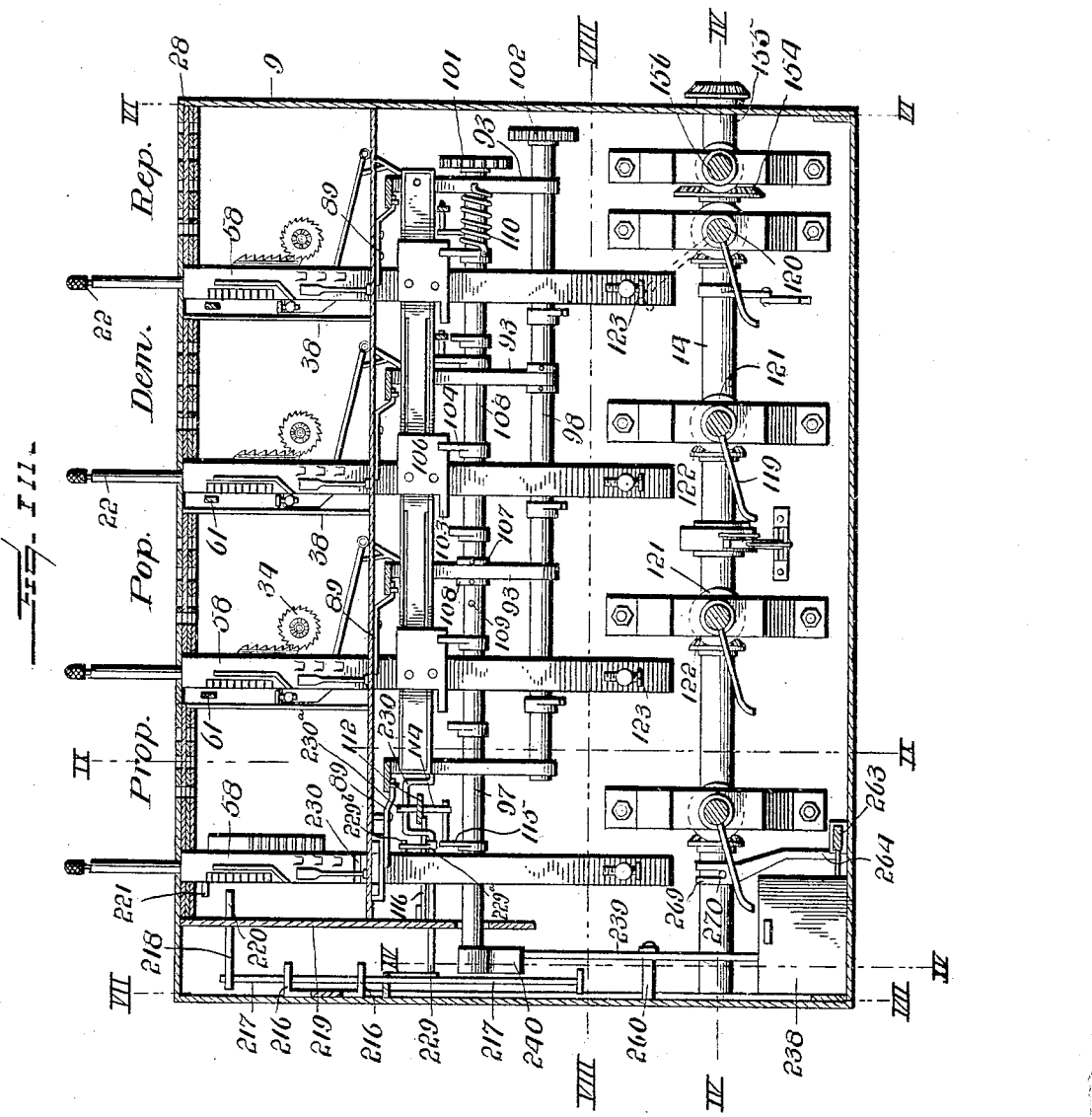

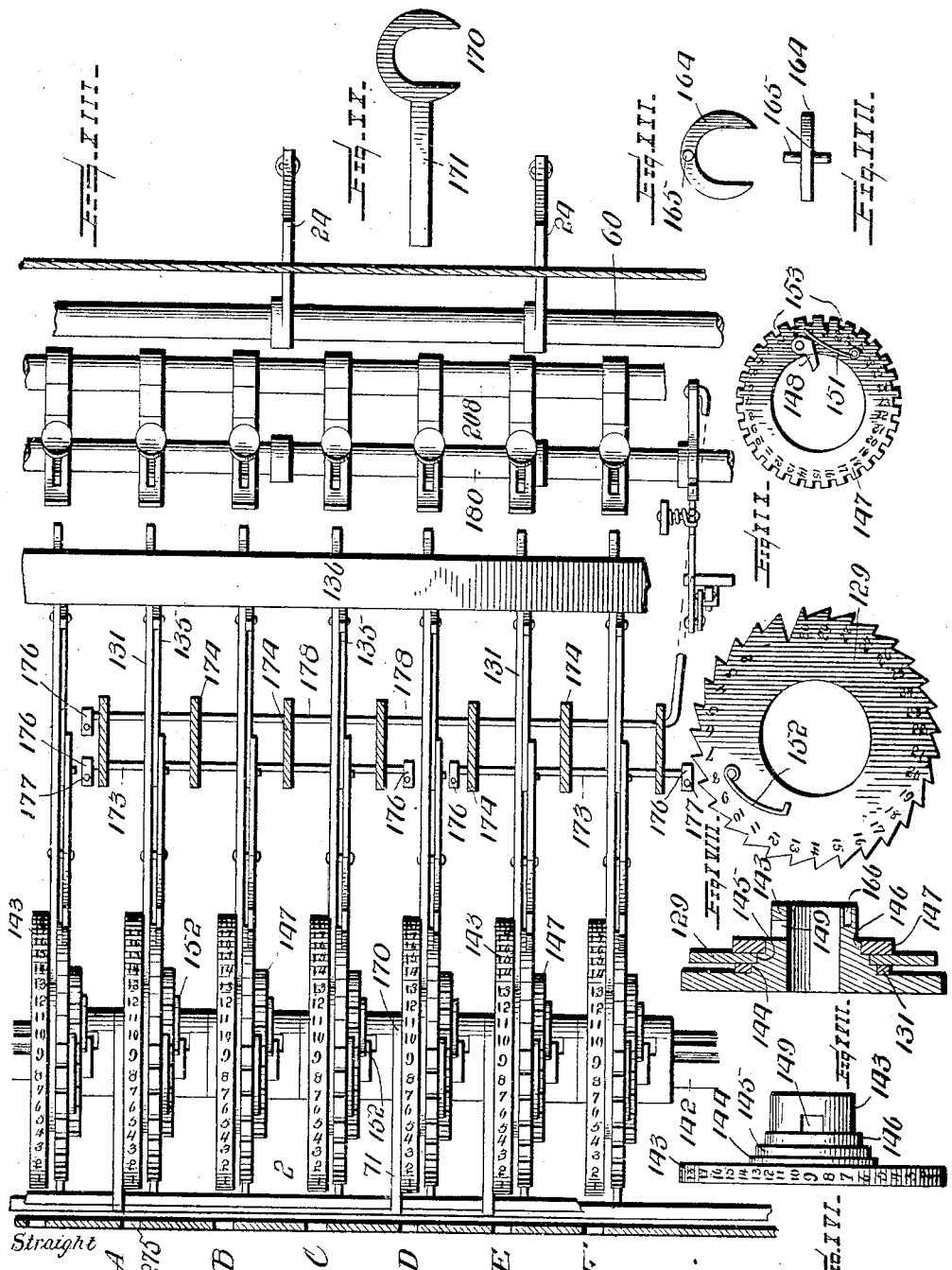

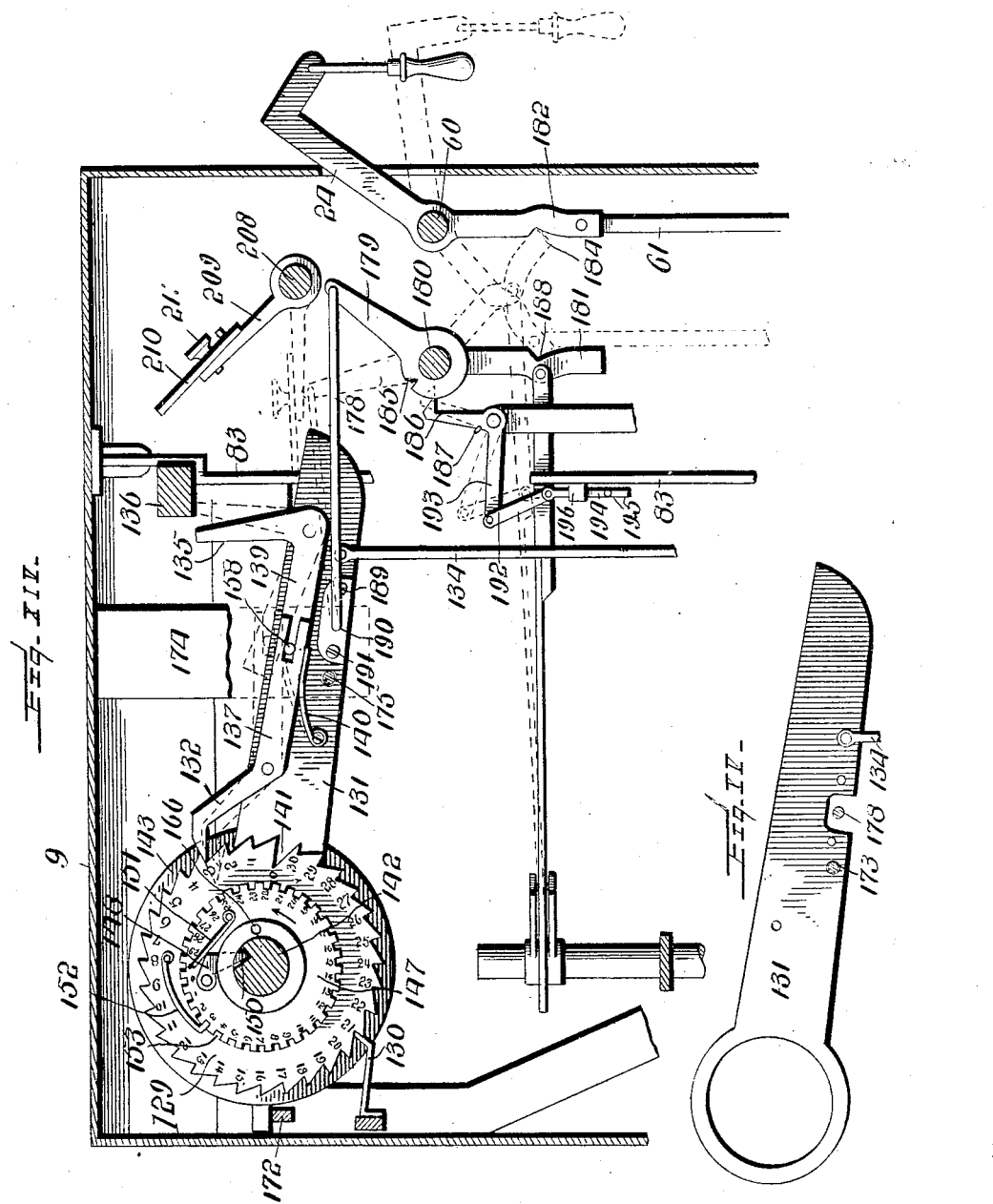

L. R. WINSLOW.
VOTING MACHINE.
APPLICATION FILED FEB. 5, 1904.
966,148.
Patented Aug. 2, 1910.
21 SHEETS—SHEET 15.
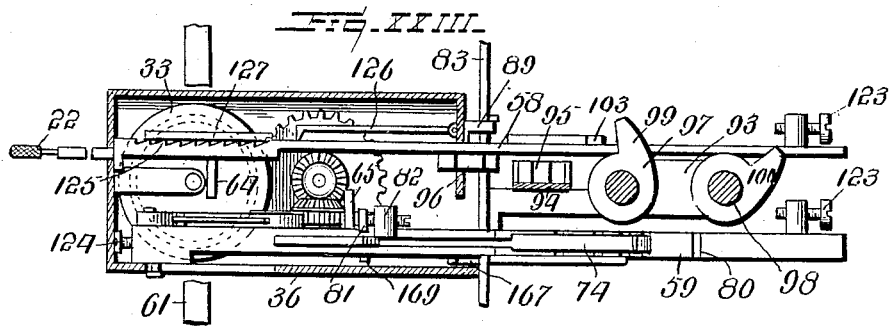
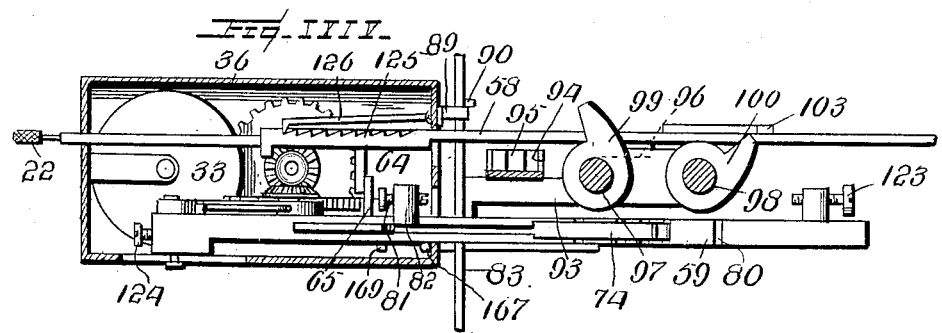
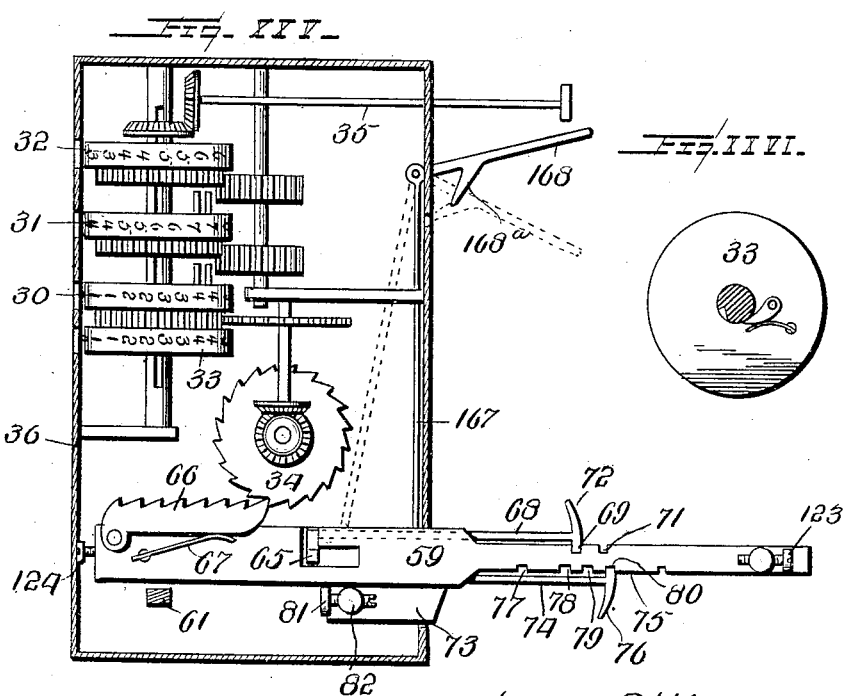

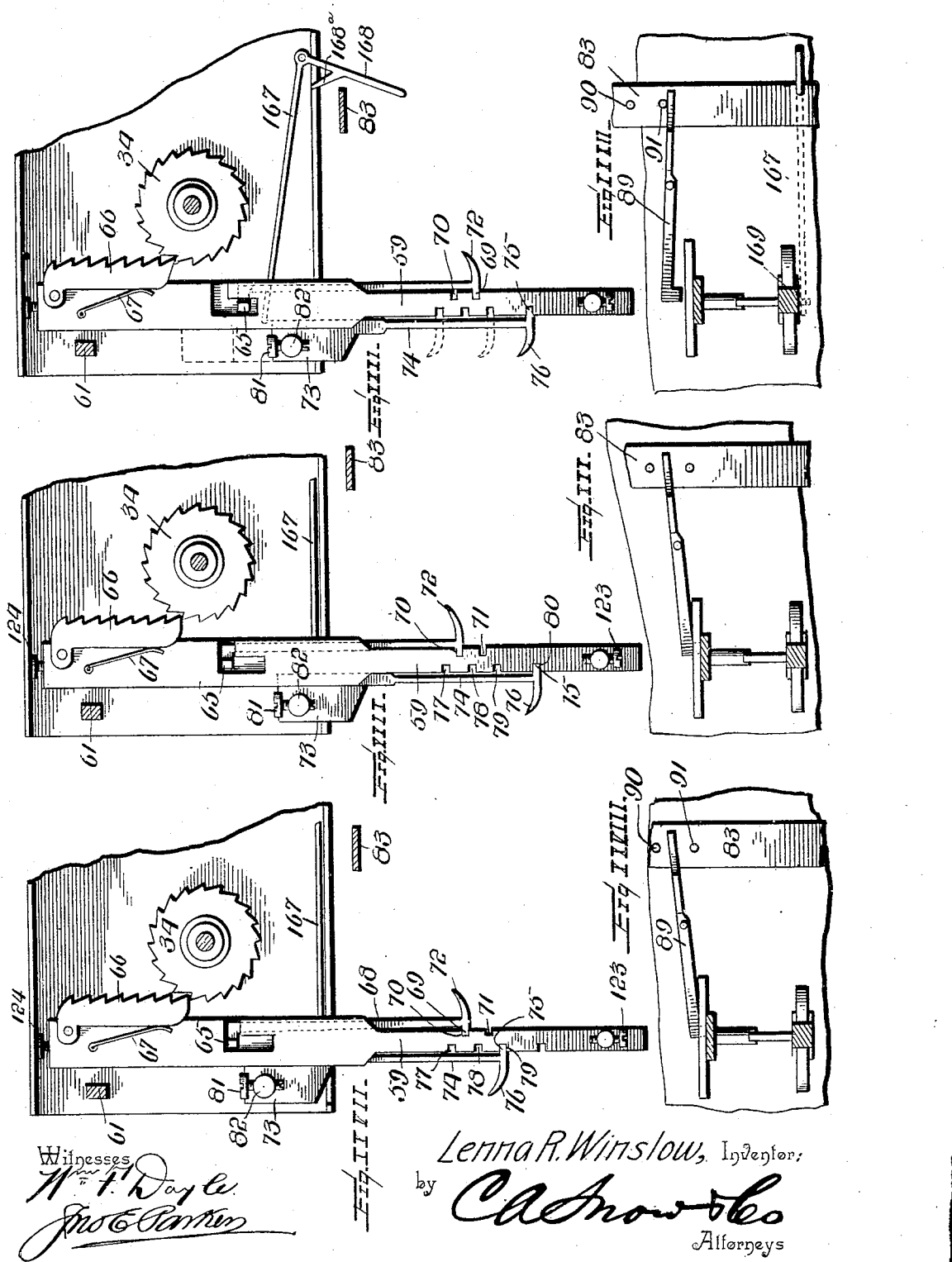

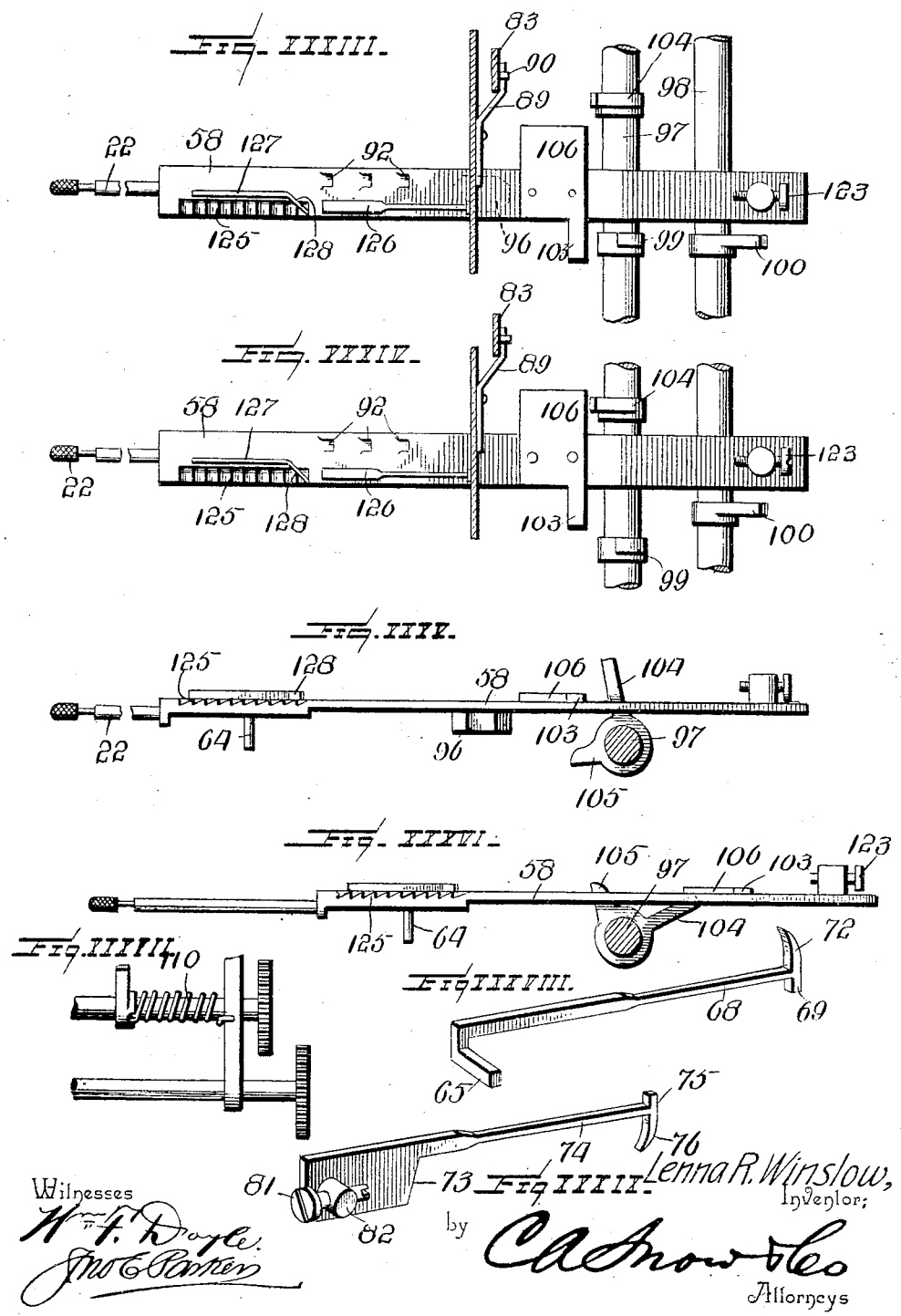

L. R. WINSLOW.
VOTING MACHINE.
APPLICATION FILED FEB. 5, 1904.
966,148.
Patented Aug. 2, 1910.
21 SHEETS—SHEET 18.
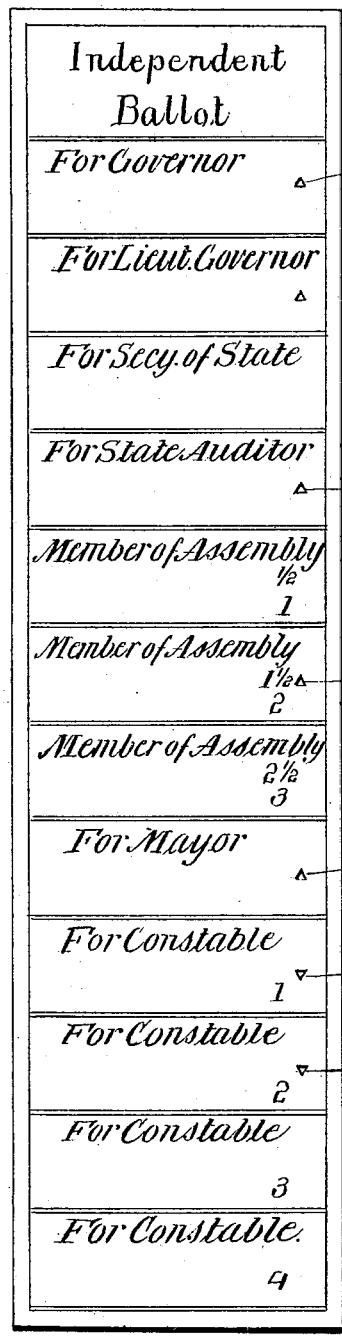
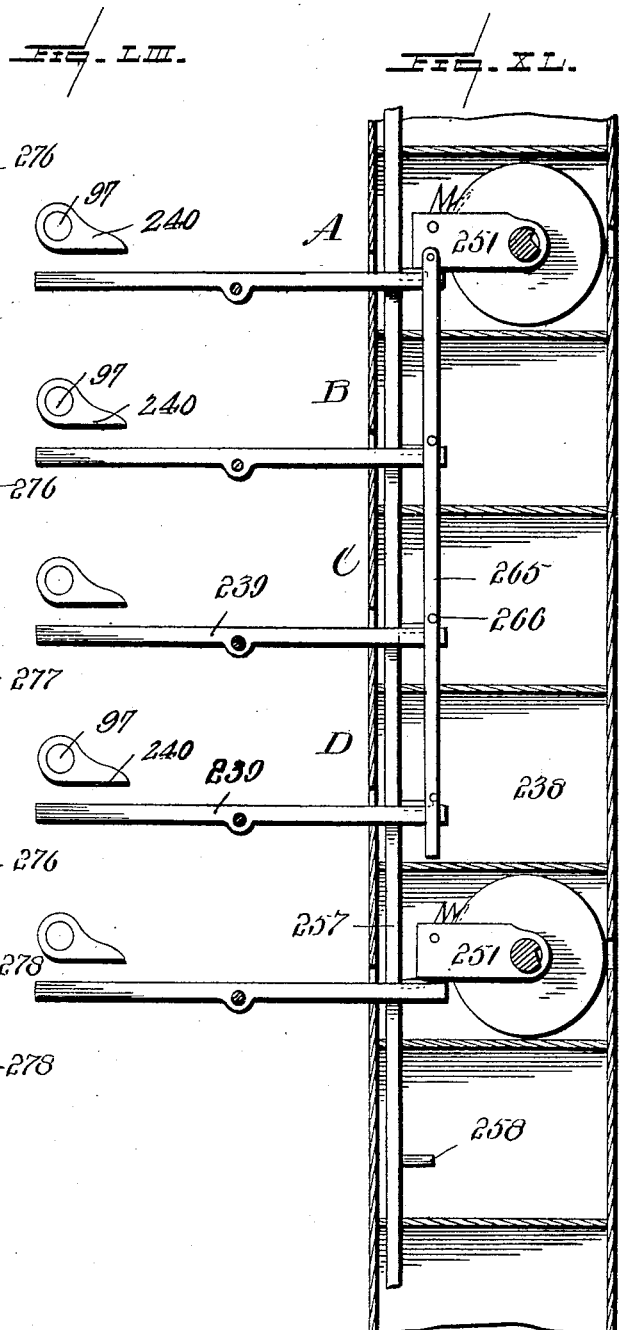

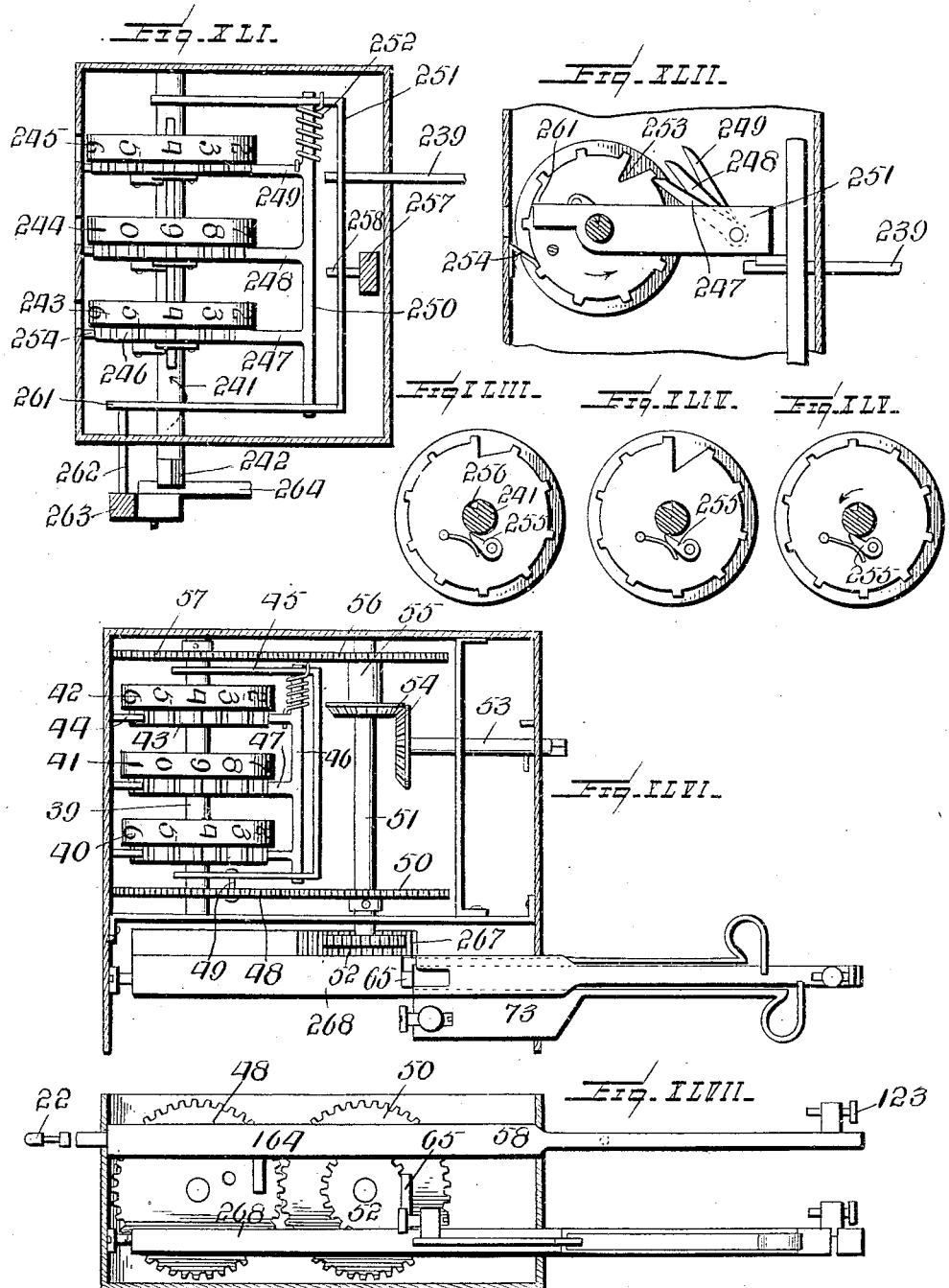

L. R. WINSLOW.
VOTING MACHINE.
APPLICATION FILED FEB. 5, 1904.
966,148.
Patented Aug. 2, 1910.
21 SHEETS—SHEET 20.
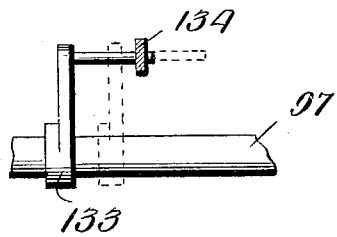
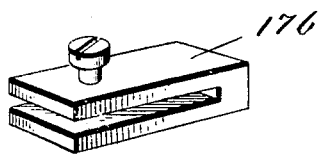
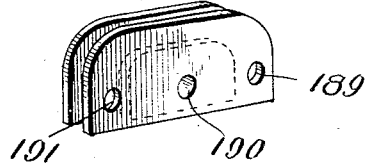
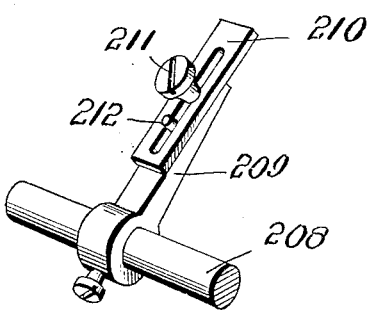
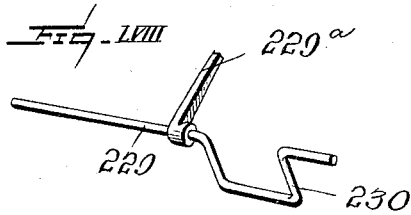
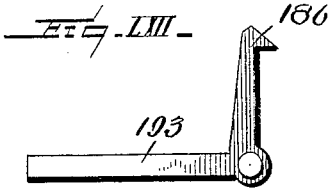
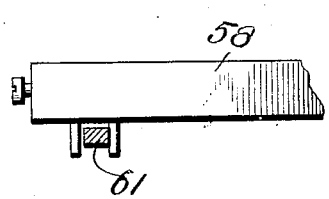
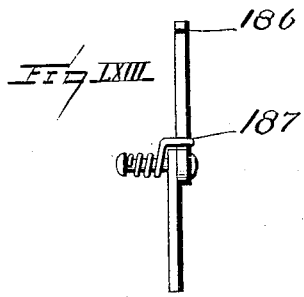
Witnesses
Lenna R. Winslow, Inventor:

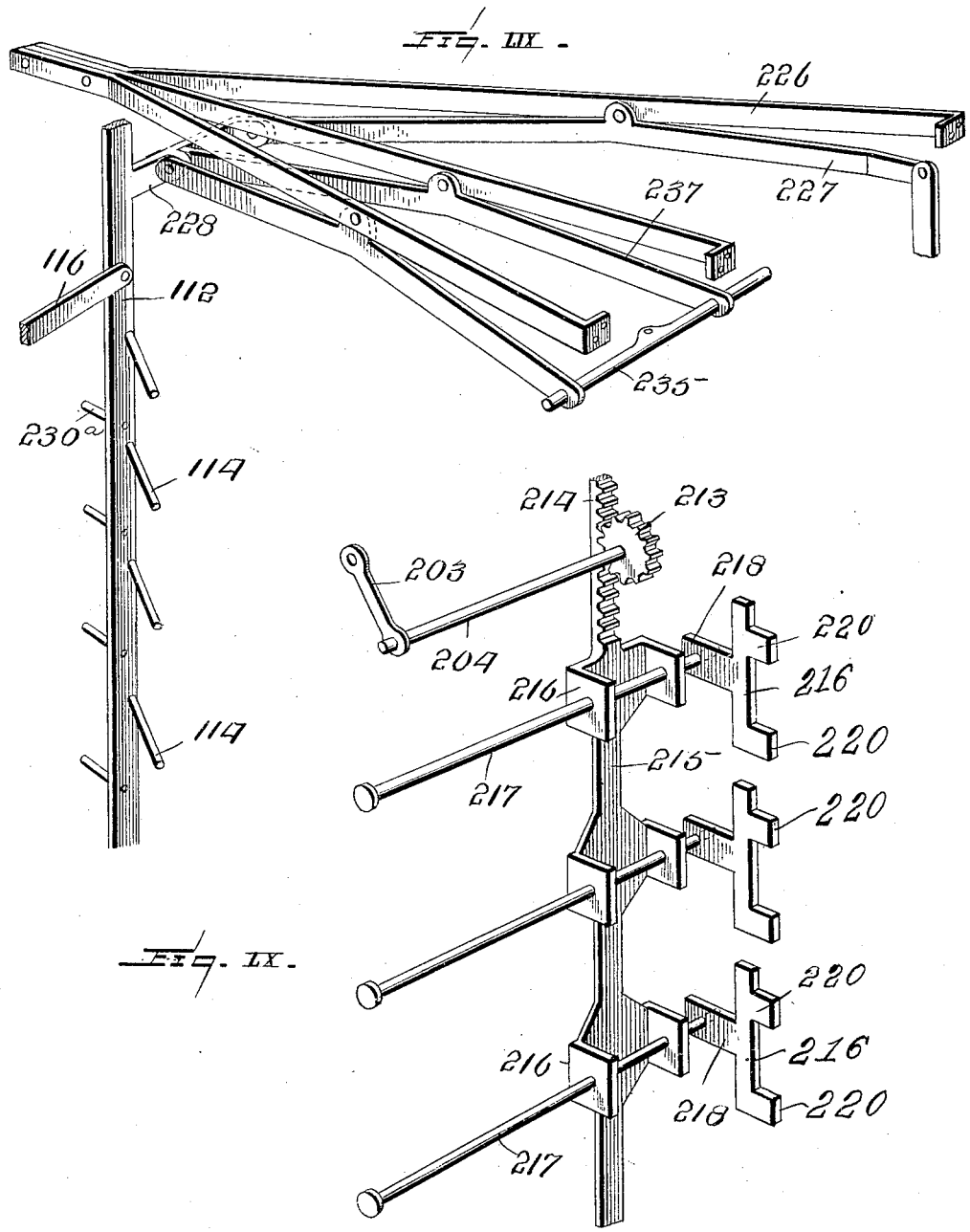

UNITED STATES PATENT OFFICE.

LENNA R. WINSLOW, OF CLEVELAND, OHIO.

VOTING-MACHINE.

966,148.  Specification of Letters Patent.  Patented Aug. 2, 1910.

Application filed February 5, 1904. Serial No. 192,178.

*To all whom it may concern:*

Be it known that I, LENNA R. WINSLOW, a citizen of the United States, residing at Cleveland, in the county of Cuyahoga and State of Ohio, have invented a new and useful Voting-Machine, of which the following is a specification.

The invention relates to voting machines of that class in which the counters are actuated directly by the operation of keys or similar devices exposed for manipulation by the voters, the operating mechanism, with the exception of the vote counters, being reset after the completion of the operations of each voter, and the objects in view are to provide means for controlling the initial adjustment of the counter-actuating devices for insuring an accurate transmission of motion therefrom to the counters, means for controlling the accurate return of the counter-actuating devices to their normal positions by the replacing mechanism, improved replacing mechanism actuated by the means which control access to the counter-actuating devices, means for registering the total number of votes cast for the candidates of all parties for each office; improved means for maintaining the movable parts of the mechanism in locked position when the booth is unoccupied; improved means for insuring a full-stroke movement of each counter-actuating device; and improved restricting or lock-out mechanism for preventing the operation of counter-actuating devices relating to offices for which a restricted voter is not entitled to vote.

Further objects and advantages of this invention will appear in the following description, and the novel features thereof will be particularly pointed out in the appended claims, it being understood that various changes in the form, proportion, and the minor details of construction may be resorted to without departing from the spirit or sacrificing any of the advantages of this invention.

Figure I is a front view of the booth showing the turn-stile controlling the entrance opening for men and women, the turn-stile being arranged in that position which indicates that the booth is empty. Fig. II is a plan view of the booth. Fig. III is a face or front view of the casing for the voting mechanism, as viewed from the interior of the booth, and showing name plates or panels, inspection openings and voting elements or exposed counter-actuating handles or grips. Fig. IV is a rear view of the voting mechanism showing the casing in section in the vertical plane of the limiting and replacing shafts, as indicated by the line IV—IV of Fig. II, and other figures, the gearing and connections for communicating motion to the replacing and restricting mechanisms and the means for operating the total voter counters, being omitted. Fig. V is a plan view of the voting mechanism showing the casing in section on the plane indicated by the line V—V of Fig. IV, and other figures, the gearing exterior of the casing and appertaining to the replacing and restricting mechanisms being omitted, this view being specially designed to show the limiting and restricting mechanisms. Fig. VI is a side elevation of the voting mechanism showing the casing in section on the line VI—VI of Fig. V, and other figures. Fig. VII is a side elevation of the voting mechanism (showing the opposite side from Fig. VI), the casing being sectioned on the plane indicated by the line VII—VII of Fig. V, and other figures. Fig. VIII is a vertical longitudinal section looking forward, the plane of the section being indicated by the line VIII—VIII of Fig. IX, and other figures. Fig. IX is a vertical transverse section on the plane indicated by the line IX—IX of Figs. V and VIII, and other figures. Fig. X is a horizontal section on the plane indicated by the line X—X of Figs. IV, VI, VII, VIII and IX, this figure being specially designed to show the means for controlling the operations of the male and female total counters, and also showing the straight-ticket voting devices (the general voting devices which are beneath the straight-ticket voting devices, and also the exterior gearing for the replacing mechanisms, being omitted). Fig. XI is a horizontal section on the plane indicated by the line XI—XI of Figs. IV, VI, VII, VIII and IX, to show particularly the general voting devices adjusted for single and class voting, the boxes of the tally or counter mechanisms being sectioned to show the inclosed mechanisms in plan. Fig. XII is a horizontal sectional view on the plane indicated by the line XII—XII of Figs. IV, VI, VII, VIII and IX, to show the general voting devices adjusted for cumulative voting. Fig. XIII is a detail plan view of the limiting mechanism and lock-out devices forming elements of the restricting mechanism. Fig. XIV is a detail side view of one of the limiting devices adjusted to lock out after casting three votes, and showing the interlock between the straight and general ticket voting devices. Fig. XV is a detail side view of one of the limiting levers. Fig. XVI is a detail side view of the hub of one of the limiting devices showing the attached vote-indicating dial. Fig. XVII is a sectional view of the same with the coöperating parts mounted thereon. Fig. XVIII is a detail side view of the ratchet disk. Fig. XIX is a similar view of the setting and assembling disk. Fig. XX is a similar view of a separating washer. Fig. XXI is a detail side view of a connecting washer. Fig. XXII is an edge view of a connecting washer. Fig. XXIII is a side view of a counter and operating devices set for single, class, or minority representation voting, the parts being shown in their initial or normal position. Fig. XXIV is a view of the same showing the parts in their second or voted position. Fig. XXV is a plan view of a counter and the counter-operating slide, with the parts adjusted for casting a whole vote at each operation, the slide-retracting spring being shown in full lines in its normal or inoperative position, and in dotted lines in its adjusted or operating position. Fig. XXVI is a side view of one of the counter dials to show the relation between the counter spindle and the dial-assembling or resetting pawls. Fig. XXVII is a detail plan view of one of the counter-actuating slides and attachments, and the operating or units ratchet of the related counter mechanism, with the parts adjusted for single or class voting and straight-ticket voting. Fig. XXVIII is a detail rear elevation of the same, the voting key and slide being shown in section and the key-locking pawl in elevation, the latter being in engaging position. Figs. XXIX and XXX are views similar, respectively, to Figs. XXVII and XXVIII, showing the parts arranged for minority representation votes. Figs. XXXI and XXXII are views similar, respectively, to Figs. XXVII and XXVIII, showing the parts arranged for cumulative voting, with the slide-retracting spring in its adjusted or operative position, and with the key-locking pawl in its adjusted or inoperative position. Fig. XXXIII is a plan view of a counter-actuating key and portions of the interlocking shafts, showing the parts adjusted for single, class, or minority representation voting. Fig. XXXIV is a similar view of the same with the parts arranged for cumulative voting. Fig. XXXV is a side view of the same with the parts adjusted for cumulative voting, and disposed in their initial or normal positions. Fig. XXXVI is a side view of the same parts arranged for cumulative voting, disposed in their adjusted positions. Fig. XXXVII is a detail view of the extremities of the interlocking shafts, showing the arrangement of the spring which is used when the gears are out of communication to adapt the parts for cumulative voting, the spring also being used on the interlocking shaft of the straight-ticket series. Figs. XXXVIII and XXXIX are detail views of the adjustable general ticket and straight-ticket voting pins. Fig. XL is a side view of the operating devices for the office-total counters. Fig. XLI is a plan view of an office-total counter. Fig. XLII is a side view of an office-total counter. Figs. XLIII, XLIV and XLV are detail views, respectively, of the dials and associated ratchets of an office-total counter. Fig. XLVI is a plan view of a counter and operating devices used in connection with amendment voting devices. Fig. XLVII is a side view of the same. Fig. XLVIII is a detail view of one of the supporting brackets for the interlocking shafts, showing the latter and interlocking blocks and guide in section, to indicate the means for limiting the rotary movement of the shafts. Fig. XLIX is a detail plan view of the selective gearing for communicating motion from the turn-stile to the replacing shaft. Fig. L is a detail plan view of the gearing for communicating motion from the turnstile to the restricting mechanism. Fig. LI is a detail elevation of the means for preventing return movement of the replacing mechanism after a fractional advancement. Fig. LII is a side view of the same showing the replacing shaft in section. Fig. LIII is a face view of an independent ballot. Fig. LIV is a detail view of the connection between the full-stroke shaft and the means for communicating motion to the limiting devices. Fig. LV is a detail view of one of the adjustable stops for the secondary interlocking runners. Fig. LVI is a detail view of one of the runner blocks of the limiting levers. Fig. LVII is a detail view of one of the restricting arms for the individual voting devices. Fig. LVIII is a detail view of the crank-shaft for actuation by the amendment keys to raise the vote indicator plunger. Fig. LIX is a detail view of the counter levers and the supporting frame of the same. Fig. LX is a detail view of the restricting mechanism for the amendment keys. Fig. LXI is a detail view showing the means for communicating motion from a straight-ticket bar to a straight ticket key. Figs. LXII and LXIII are detail views of the locking lever for the straight ticket interlocking devices.

In the illustrated embodiment of my invention I employ a booth having an entrance opening, admission and exit through which is controlled by a turn-stile so constructed as to conceal the interior of the booth and the operations of an occupying voter when the latter has passed thereinto, and to expose the interior after the voter has left the booth; and preferably on the same wall of the booth in which is located the entrance opening, is disposed a casing containing the voting mechanism, the handles or buttons of suitable voting elements being exposed at the inner face or front of this casing, and suitable total and other indicating counters being exposed at the outer or rear face of the casing for the benefit of spectators and officers in charge of the election.

Within the casing are located individual and total vote-counting devices or tally mechanisms for indicating respectively the number of votes cast for each nominee of each party in the field, the total number of straight tickets, the total number of persons admitted to the booth, the total number of voters, or those actually casting one or more votes, the total number of unrestricted voters (as men), the total number of restricted voters (as women), the total number of votes cast for all of the nominees for the same office, and the number of offices (without distinction as to party) for which any occupant of the booth has cast votes, as a guide to the election officers in issuing independent ballots which may be called for by voters whose selections for certain offices may not be found among the nominees of either of the parties in the field. The casing also contains counter-actuating devices, grouping mechanism whereby a number of single-candidate series may be arranged in a group, as for presidential electors, main interlocking devices for preventing the simultaneous operation of two or more keys in a single-candidate series, locking devices for preventing subsequent operation of one counter while a previously operated counter in the same single-candidate series remains in its voted position, secondary interlocking devices for preventing simultaneous operation of two counters in different single-candidate series, straight-ticket interlocking devices for preventing simultaneous operation of a straight-ticket voting element and an individual voting element, straight-ticket locking devices for preventing operation of a straight-ticket voting element after an individual voting element of the same party series has been actuated, and vice versa, limiting mechanism for limiting the number of voting elements which can be operated by a voter after entering and before leaving the booth, whether the voting mechanism is set for single-ticket, class, minority representation, or cumulative voting, or whether different single-candidate series are set for two or more of said classes of voting, replacing mechanism to be actuated by the turn-stile to replace the voting devices as the voter leaves the booth, to retain the voting elements in locked position while the booth is empty, and to liberate the voting elements when the turn-stile is moved to admit a voter, releasing devices for liberating those voting elements which are locked successively in their voted positions to prevent the repeated operation of a single voting element by the same voter, locking devices for preventing withdrawal of a voting element after a fractional voting movement thereof, checking devices for preventing voting movement of an element after a fractional withdrawal thereof when said voting element is adjusted (as in cumulative voting) for repeated actuation (controlled by the limiting mechanism), checking devices for preventing return to the booth (with the accompanying release of the voting mechanism) when a voter has made a fractional movement of the turn-stile in the act of leaving the booth, means for casting and counting fractional or whole votes, and means controlled by the movement of the turn-stile for restricting certain classes of voters as to the offices for which they may cast votes, and as to the questions, amendments, etc. in connection with which they may vote.

The booth construction shown in Figs. I and II embodies a front wall 1 and a rear wall 2 connected by sectional end walls 3 hinged at their opposite edges respectively to the front and rear walls, and the sections being hinged together at their meeting edges to fold inwardly between the front and rear walls. In the front wall is formed an entrance opening controlled by a turn-stile having a spindle 4, oppositely-extending bars 5 which occupy a position in the plane of the front wall when the booth is empty, and screen wings 6, arranged in a plane at right angles to the plane of the bars 5, and adapted to occupy a position in the plane of the front wall when the booth is occupied. At its lower end the spindle 4 is provided with a cam head 7 resting on a cam seat 8, whereby the coöperating inclined faces insure the complete movement of the turn-stile through an angle of ninety degrees. The restricted and unrestricted voters enter the booth respectively at opposite sides of the spindle 4, and thus turn the stile respectively, in opposite directions, for a purpose hereinafter explained.

Secured to the front wall of the booth is a casing 9, within which the voting mechanism is inclosed, said casing being exposed at its inner or front side within the booth, whereby the handles or grips of the voting elements are accessible to the voter, and at its outer or rear side the casing is provided with doors 10 having suitable locking mechanism to be controlled by the judges of election, and also provided with movable flaps 11 and 12, preferably hinged to the casing and covering openings through which vote indicators and total counters are respectively exposed when the flaps are displaced. Also in one of the doors 10 is formed an opening 13 through which certain total counters are exposed for the instruction of the public, the purpose of these total indicators being suggested by certain abbreviations and initial letters adjacent to the slot, and respectively representing the words "Restricted", "Unrestricted", "Total voters", and "Total admission", all as explained more fully hereinafter. Also projecting from the casing 9 is a replacing shaft 14 connected by a counter-shaft 15 and suitable bevel gearing with a turn-stile-operated shaft 16 mounted parallel with and above the front wall of the booth. The turn-stile spindle 4 is provided with a mutilated gear 17 (Fig. XLIX) for actuating bevel gears 18 and 19 on the shaft 16. The turn-stile will communicate motion to the shaft 16 when turned in either direction, the motion which is communicated to the shaft 16 being in the same direction in both cases. Also, by this gearing the shaft 16, and hence the replacing shaft 14, will be turned in one direction when the turn-stile is moved to admit a voter, will be held stationary while the booth is occupied, and will be turned in the reverse direction when the turn-stile is moved to permit the exit of the occupant. To receive the projecting portions of the voting elements, when the booth is folded, the rear wall of the latter is provided with an extension 20.

The proportions of the parts indicated in Figs. I and II are approximately correct, but in the remaining general views devoted to the casing and the contained mechanism it has been found necessary to depart from these proportions, particularly as to the depth from front to rear of the casing in order to obtain sufficient space within which to properly illustrate the parts; but inasmuch as the dimensions of the casing will depend upon the number and dimensions of the contained elements, and as the number of the voting elements will depend upon the number of parties in the field and the number of candidates nominated by each party, or, in other words, the number of offices to be filled, it will be understood that the proportions are of no importance.

In the construction illustrated, the front wall of the casing is provided with four vertical columns of inspection openings, devoted to the counters or tally mechanisms respectively of three political parties, and to propositions, questions or amendments. The number of party rows or columns may be varied, as before indicated, and also the number of single-candidate series may be increased, but for the purposes of illustration I have deemed it sufficient to show six single-candidate series, indicated respectively by the reference letters A to F inclusive, the vertical columns being similarly designated by the abbreviations "Rep.," "Dem.," "Pop.," and "Prop." This number of single-candidate series (which in the construction illustrated are arranged horizontally, and the party series of columns vertically), provides for assigning three candidate series designated A, B, and C to class voting, as for Presidential electors, one single-candidate series, D, to a single-ticket voting, as for mayor, and two single-candidate series, E and F, to cumulative voting, as for town council. The panels 21 arranged respectively adjacent to the sets of inspection openings, are designed to receive the names of the candidates, and also adjacent to and beneath each panel is a push-button or handle 22 for operation by the voter.

The inspection openings in the proposition column are grouped in pairs, of which the members are designated respectively "Yes" and "No", and in this column also will be found panels 23 for information relative to the question to be voted, the operating buttons or handles 22 being located adjacent thereto. The uppermost set of inspection openings in each party column is devoted to straight-ticket tally mechanism, of which the operating element 24 projects through the front wall of the casing above the column, and is provided with a grip 25. In the construction illustrated, each set of inspection openings consists of four openings, of which one, 26, is permanently open, and of which the others, 27, are normally closed, and slidingly mounted on the inner surface of the front wall of the casing is a shield plate 28, see Figs. X, XI and XII, provided with slots 29 indicated only in dotted lines in Fig. III. This shield is adapted for upward movement from its normal position and the slots are normally located below the sets of inspection openings, whereby, when it is desired, after the election, to count the votes, or determine the result of the election, it is only necessary to raise the shield to register the slots with the inspection openings in order that the numbers indicated by the counters or tally mechanism of the machine may be read. The permanently open inspection openings enable each voter as he operates a voting element, to see that he has actually registered a vote for that candidate, suitable indicating devices (hereinafter described) being employed, and being within view through said openings.

The vote counters or tally mechanisms are arranged in horizontal or single-candidate series, corresponding with the arrangement of the inspection openings, as above described, and as the details of construction of the tally mechanism used for registering the number of votes cast for each candidate are unimportant, in so far as the mechanism now being described is concerned, it will suffice to explain that each embodies units, tens and hundreds dials, respectively numbered 30, 31 and 32 (Fig. XI), visible through the inspection openings 27, an indicator dial 33 visible through the inspection openings 26, a units ratchet 34 for communicating motion through suitable gearing to the indicator and units dials, simultaneously, other gearing for communicating motion respectively from the units to the tens dials, and from the tens to the hundreds dials, and a resetting shaft 35, the indicator and units dials being peripherally marked in whole and half numbers, as 1, 1½, 2, 2½, etc., to indicate and register whole and half votes, and the tens and hundreds dials being doubly numbered, as 1—1, 2—2, 3—3, etc., all as explained in detail in my copending application, No. 741,842, filed December 28, 1899. Except in Fig. XI, (and in detail in Figs. XXIII to XXVI) the tally mechanisms are not shown completed, in order to avoid complicating the illustration, but it will be understood that they would appear in Fig. XII where only the units ratchets 34 are indicated. In practice, these tally mechanisms are provided with casings or boxes 36, which are separate from the machine casing and are supported on rods 37 extending horizontally through vertical partition walls 38, extending rearward from the front wall of the casing.

In addition to the tally mechanisms used in the party columns, it is preferable to employ a simplified counter or tally mechanism in connection with the means for voting on propositions. This simplified tally mechanism is shown at the left in Fig. XI, and in detail in Figs. XLVI and XLVII, and it consists of a spindle 39 carrying units, tens and hundreds dials 40, 41 and 42, provided with ratchets 43 engaged by retaining pawls 44; a pawl frame 45 of stirrup form fulcrumed on the spindle for swinging movement and carrying a spring-actuated triple pawl 46 having fingers 47 arranged respectively in operative relation with the ratchets on the dials, a gear 48 connected by a pin 49 with the pawl frame to communicate oscillatory movement thereto, a gear 50 meshing with the gear 48 and carried by a spindle 51 on which is a pinion 52; a resetting spindle 53 connected by bevel gears 54 with a sleeve 55 carrying a spur wheel 56 meshing with a similar gear 57 fixed to the dial spindle 39. The details of construction and operation of this tally mechanism will be explained hereinafter as will the means whereby motion is communicated by the voter to the pinion 52.

Operatively related with each vote counter is a voting element comprising a voting key 58 which carries the button or handle 22, and a slide 59 to receive motion from the member 58, the means for communicating motion from the operating member to the operated member being such as to provide for a variable movement of the latter, whereas the movement of the former is constant or uniform. In other words, the relation between the operating and operated members of each voting element or counter-actuating device is such that under all circumstances the distance through which the former moves during each operation is and must be uniform, whereas the motion communicated to the operated member may be varied to suit the requirements and conditions under which the particular counter is being used, as more fully explained hereinafter. Thus, by allowing the movement of the operating member to be controlled by the voter, under certain restrictions hereinafter explained, and providing for the operation of the counter or tally mechanism by the operated member, it is possible to so arrange the parts that either a whole or fractional vote, or a multiple vote may be cast by one operation of the key.

The straight-ticket voting elements are of a construction similar to that of the individual voting elements, with the exception that the grip or handle by which the voter communicates motion thereto is not carried directly by the operating member, but consists of a lever 24 mounted on a shaft 60 and carrying a bar 61 supported at its lower end by a link 62, the slides 58 and 59 (the same numerals are retained for these parts because the only difference in construction is that the operating member or slide 58 is not in this instance provided with the attached handle or grip 22) being provided with means for receiving motion from the bar 61 when the latter is moved to the rear. In the construction illustrated, the slide 58 is provided with pins 63 between which the bar 61 slides, (as shown in Fig. LXI) and the slide 59 is provided with a projection which will be described fully in connection with the general voting devices.

The operating member 58, whether of the straight ticket or individual voting devices, communicates motion to the operated member by means of coöperating motion-transmitting devices, one of which is adjustable, and in the construction illustrated these motion-transmitting devices consist of a pin 64 depending from the operating member, and a pin 65 carried by and adjustably mounted upon the operated member, whereby with the parts in their normal or initial positions, a greater or less movement of the operating member will be necessary before motion is communicated to the operated member, to provide for the movement of the operated member through a greater or less distance according to the required movement of the counter which receives motion from the operated member through the units ratchet 34 and a plural-toothed pawl 66 mounted upon the slide 59 and having an actuating spring 67 (Figs. XXIII to XXV and XXVII to XXXIX). The pin 65 is carried by a stem 68 adjustably fitted in a mortise or groove formed in the edge of the body portion of the slide 59, and having a terminal stud 69 for engagement with either of a plurality of seats or notches 70, 71 in the reduced portion at the rear end of the slide 59. The stem is also provided with a finger-hold 72 to facilitate adjustment of the pin, and the stem is preferably of yielding or spring material to maintain the stud in the seat in which it is placed. In the construction illustrated, means are provided for two adjusted positions of the pin 65. As shown in Figs. XXVII and XXIX the stud is arranged in the forward seat 70, and this may be termed the forward or whole-vote position, whereby when the operating member 58 moves from the position shown in Fig. XXIII to the end of its complete stroke, as seen in Fig. XXIV, the member 59 will have moved through a distance sufficient to cause the pawl 66 to turn the ratchet wheel 34 through one-tenth of a revolution. Preferably, the ratchet-wheel is provided with twenty teeth to allow definite movement through one-twentieth of a revolution or a half-step, and, therefore, when the pin 65 is adjusted to its rear position, as shown in Fig. XXXI, the pin 64 of the operating member will engage the pin 65 later in the stroke of the operating member, and thus will carry the operated member a distance only sufficient to advance the ratchet disk one tooth, and thus move the units dial of the counter to register a one-half vote.

Whereas the series of counters in the uppermost or straight-ticket row are important as a means of keeping the tally of the number of straight tickets cast in each political party row, it is necessary that each operation of a straight-ticket voting element shall register a vote on each of the counters in the party column (unless for reasons hereinafter explained, as in minority representation voting, it is desirable to disconnect the devices arranged for actuating the counters, and provide only for the advancement of such counters by the operation of the individual keys), and, therefore, the operated member of each voting element is provided with a projection 73 in the path of the straight-ticket bar 61, the same being adjustably mounted upon the member 59, and having a spring stem or tongue 74 terminating in a stud 75, and a finger-hold 76, said stud being adapted for engagement with any one of a series of seats or notches 77, 78, 79 and 80 formed in the reduced portion of the member 59. Also to provide for attaining a nicety of adjustment after the construction of the machine, to overcome any irregularity in the construction, and insure an accurate and complete operation of the slide, an adjustable contact point 81 is preferably mounted on each projection 73, said contact point in the construction illustrated consisting of a screw adjustable in a boss 82 on the projection. When the projection is adjusted, as shown in Fig. XXVII, with the stud 75 in the seat 79, the bar 61 will carry the slide through one whole-vote movement, to impart a one-tenth revolution to the units dial, as in single or class voting, whereas when the projection is adjusted to the position in which the stud is in engagement with the seat 80, as shown in Fig. XXIX, the projection is out of the path of the bar 61, and, therefore, the slide 59 will not receive motion therefrom. This is the position of the straight-ticket projection 73 on those voting elements which are devoted to minority representation voting. When the projection 73 is adjusted to the position in which the stud 75 is in the seat 78, the movement imparted to the slide 59 by the operation of the straight-ticket lever, will be sufficient to register a one and one-half vote on the counter, and when the stud is engaged with the seat 77, the motion imparted to the member 59 will be sufficient to register three votes. The last-named position is indicated in dotted lines in Fig. XXXI, and is of value in cumulative voting.

In order that the utility of the above-described adjustments may be fully understood, it should be explained that in "single" voting the adjustment of the parts devoted to that use is such that one operation of a voting element will advance the counter sufficiently to register one full vote, the operation of this voting element being independent of all others in the machine, and being adapted for conditions wherein each political party places one candidate in the field for a given office, such as mayor, see row D. In "class" voting wherein each political party places in the field a number of candidates equal to the number of offices of the same rank to be filled, such as Presidential electors, each voter is entitled to operate a given voting element only once, but he may select from the candidates of all of the political parties, and cast a number of votes equal to the entire number of offices to be filled, suitable limiting mechanism (hereinafter described) being employed to prevent him from voting a greater number (see rows A, B and C). In "minority representation" voting each party places in the field a number of candidates in excess of the number of offices of the same rank to be filled, and each voter, while free to select from the total number, is permitted to cast a number of votes only equal to the number of offices to be filled, as for school trustees. In "cumulative" voting, each political party places in the field a number of candidates equal to or less than the number of offices of the same rank to be filled (see rows E and F), as for town councilmen, and each voter is entitled to cast a number of whole votes equal to the number of offices to be filled, but he can distribute his votes as he prefers, giving one vote to each of the candidates of his party if the number of candidates is equal to the number of offices to be filled, or giving all of his votes to one candidate, or splitting his vote, to divide it equally or otherwise among two or more selected candidates. For instance, if the number of offices to be filled is three, and three candidates are placed in the field by his party, the voter may give each candidate one vote, or may give each of two candidates one and a half votes, or may give one candidate two votes and another one, or may give one candidate three votes. On the other hand, whereas one party may be able to place three candidates in the field for the three offices, another party, not so strong, may be able only to place two candidates in the field for those offices, and a third party may be able to place only one candidate in the field. This will necessitate casting three votes for the single candidate or one and a half votes for each of the two candidates in the weaker parties. When a voter desires to vote a straight ticket, therefore, it is necessary that the parts should be adjusted so that the operation of the straight-ticket voting elements shall advance all of the counters devoted to single voting to register one whole vote, and, therefore, the adjustment of the projection 73 as shown in XXVII is necessary. The same adjustment is necessary on the voting elements devoted to class voting, wherein the number of candidates is equal to the number of offices to be filled. In those rows devoted to minority representation voting, on the other hand, the projection 73 must be adjusted so that the keys will not be affected by the operation of the straight-ticket lever, as each voter is entitled to cast a number of votes which is less than the total number of candidates for that office in the field (see Fig. XXIX). In cumulative voting the adjustment of the projection 73 will depend upon the number of candidates in the field by each party.

Returning to the example of three offices, it will be seen that in that party row in which three candidates have been nominated, the projection 73 must be arranged in its one-vote position, so that the operation of the straight-ticket lever will advance all of the counters devoted to cumulative voting in that party column through a one-vote movement; the projection 73 in the party column wherein only two candidates have been nominated for three offices, must be arranged in the one and a half position, with the stud 75 in the seat 78, so that the operation of the straight-ticket lever will advance the keys of both counters sufficiently to indicate one and a half votes on each counter; and in the party column wherein only one candidate has been placed in the field the projection 73 must be arranged in its three-vote position, with the stud 75 in engagement with the seat 77, so that the operation of the straight-ticket lever will advance the slide 59 sufficiently to impart a three-vote movement to the counter which is actuated thereby.

It is necessary in a machine of this type to provide means for preventing the repeated operation of voting elements not devoted to cumulative voting; to prevent the simultaneous operation of two or more voting elements in the same single candidate series; to prevent the simultaneous operation of two or more voting elements in different single candidate series, and either in the same or different party column, and to otherwise guard against fraud in the manipulation of the machine, and, therefore, in the construction illustrated there is employed a releasing frame consisting of uprights 83 and cross-bars 84, suitably mounted in the casing for downward movement from its normal position in which it is held by levers 85 fulcrumed upon suitable brackets 86, (Fig. VII and IX) and having yokes 87 in which operate cams 88 fixed to the replacing shaft 14, whereby when the turnstile is moved in one direction, to permit the exit of a voter, the replacing shaft will turn to elevate the adjacent ends of the levers 85 and thus depress the releasing frame. Mounted respectively adjacent to each counter is a key-locking pawl 89 (Figs. VIII, IX, XI, XII, XXIII, XXIV, XXVIII, XXX, XXXII, XXXIII and XXXIV). On the releasing frame, respectively adjacent to the tails or rearward extensions of these pawls, are arranged pairs of upper and lower pins 90 and 91, and when these tails or extensions are arranged between the pins, as shown in the single candidate series A to D, inclusive, (Fig. VIII) the pawls are free to engage by gravity with notches 92 in the operating member 58, three of these notches being illustrated, whereby the pawl engages successively therewith as the key is advanced, to prevent retraction of the key after a partial or full operation. By placing these notches so that they will be engaged respectively after the accomplishment of each of a series of functions to be performed by the key, it will be seen that the repetition of either of these functions will be prevented.

When the tail or extension of the pawl is arranged beneath the lower pin 91 on the releasing frame, the nose or operating extremity of the pawl is raised out of operative relation with the key, as shown in rows E and F, (Fig. VIII) which, in the construction illustrated, are devoted to cumulative voting, and, therefore, in these rows the withdrawal of the key is permitted to allow successive operations whereby a plurality of votes may be cast for the same candidate. The depression of the releasing frame by the movement of the turn-stile will cause the pins 90, by contact with the tails or extensions of the pawls, to lift the latter out of engagement with the keys, to permit the replacement of the voting elements to their normal positions for operation by a subsequent voter.

On brackets 93 carried by the releasing frame are arranged guides 94 in which are arranged interlocking blocks 95 for coöperation with double-ended wedges 96 carried by the operating members of the voting elements, these blocks being free to slide in the guide and having beveled extremities adapted to be separated by the wedges, but the combined lengths of the blocks with relation to the guide being such that only one wedge can pass into and through a guide at one time. Thus, when a key is advanced from the position indicated in Fig. XXIII, the first function accomplished is the spreading of the locking blocks by the wedge 96, to lock out all of the remaining keys in the same single-candidate series, although, after the wedge has passed entirely through the guide, other keys in the same single-candidate series may be operated. Also mounted in suitable bearings in the brackets 93 are front and rear parallel shafts 97 and 98 carrying similar cams 99 and 100, and provided at one end with intermeshing gears 101, 102. The normal positions of these cams are shown in Figs. XXIII and XXIV, with the projections or arms of the cams 99 in the paths of narrow lateral projections 103 carried by the operating members of the voting elements, and when the key is advanced the contact of the projection 103 with the arm of the cam 99 turns the shaft 97 and with it the shaft 98, by reason of the gears 101, 102, so that the projecting arm of the cam 100 is brought into the path of the projection 103. The continued movement of the key brings the projection 103 into contact with the cam 100, and thereby turns the latter with the shaft 98 to the position indicated in Fig. XXIV, at the same time returning the shaft 97 and cam 99 to their original or normal positions. In this way one complete stroke of a voting key moves both shafts first to an adjusted and subsequently to the original or normal position. The depression of the releasing frame by the movement of the turn-stile, as hereinbefore explained, carries the shafts with their cams downturned out of the paths of the projections 103, to permit the replacement of the voting elements. The shaft 97 also carries a series of lock-out cams 104 and stops 105, and while these cams are normally inoperative, or are inoperative when the gears 101, 102 are in mesh, the shaft 97 is capable of longitudinal adjustment in the bearings of the brackets to arrange the cams 104 in the paths of wide projections 106 also carried by the operating members of the voting element.

The shafts 97 and 98 are normally held from endwise movement by collars 107, 108 (Fig. XII) arranged on opposite sides of the brackets 93, and the collars may be adjusted to permit the adjustment of the shaft, said shaft having a plurality of openings 109 to receive the pins or screws by which the collars are secured to fasten the shaft in either of its adjusted positions. The width of the projection 106 is such that when the key is advanced to cast a vote (the shaft 97 being in its adjusted position as shown in Fig. XII and also in Fig. XXXIV) the projection remains in engagement with the cam 104 (see Fig. XXXVI) thus holding the shaft 97 in the position to which it has been moved with the stops 105 in the paths of all the projections 106 in the same single-candidate series, whereby all of the voting keys in that series are locked against operation. Not until the operated key has been withdrawn or replaced can another key in the same candidate series be actuated. To automatically return shaft 97 to its initial position when the operated key has been withdrawn, a spring 110 (see Figs. XII and XXXVII) is employed. This adjustment of the parts is designed especially for cumulative voting, see series E and F, and in this adjustment of the parts the returning shaft 98 (which is employed in single, class and minority representation voting to return the shaft 97 to its normal position during the complete advancement of a voting key), is idle. Hence, in Figs. XXXV and XXXVI in which this adjustment is shown, the illustration of shaft 98 is omitted.

The functions of the shafts 97 and 98 are, first, to communicate motion to the limiting mechanism, to be described hereinafter, second, to lock the voting keys in the same single-candidate series against operation while one key remains in its voted position in cumulative voting, as above explained, and, third, to communicate motion to an indicator which shows whether the occupant of the booth has voted. In the construction illustrated, this indicator consists of a plate 111, normally concealed within the casing, preferably bearing the words "Vote cast", and adapted to be projected through a slot in the top of the casing, as shown in Figs. IV and VIII, by the elevation of a bar 112 connected with a lever 113, said bar having a series of pins 114 arranged in the paths of crank-arms 115 on the shafts 97. Any suitable means may be employed for supporting the bar 112, such as links 116 pivoted to a fixed part of the frame or casing, see Fig. VIII. In the straight-ticket series of counters the rear or returning shaft 98 is omitted, the shaft 97 only being employed, and being provided with the return spring 110, see Fig. VIII. Also, to limit the movement of the shaft 97, its collars 107 are provided with shoulders 117, in the path of which is arranged a fixed pin 118 on the bracket 93. The interval between the shoulders 117 is sufficient to allow a complete angular movement of the shaft 97 and prevent excessive movement, whereby a quick operation of a voting key will not serve to throw said shaft beyond its normal path of movement. (See Fig. XLVIII.)

The means for replacing the voting elements after they have been released from the pawls 89 by the downward movement of the releasing frame, which is actuated, as hereinbefore explained, by the replacing shaft 14 (in turn receiving motion from the turn-stile), consist of replacing arms 119 arranged for movement respectively in the planes of the operating and operated members of the voting elements, and, in the construction illustrated, carried by vertical spindles 120, (Fig. IV,) respectively connected by bevel gears 121, 122 with the replacing shaft. The normal position of these replacing arms is indicated in Figs. XI and XII, out of the paths of the voting elements and in rear thereof, but when the occupant of the booth moves the turn-stile to leave the booth, a partial rotation of the replacing shaft 14 is effected, and this motion being communicated to the spindles 120, the replacing arms swing forward and come in contact, respectively, with the operating and operated members of the voting element, said arms retaining this adjusted position, and thus locking the voting elements in their normal positions, until the turn-stile receives motion in the opposite direction and thus, by reversing the movement of the replacing shaft, withdraws the replacing arm to the positions indicated in Figs. XI and XII. The adjusted or locking position of one of the replacing arms is indicated in dotted lines in the above mentioned figures of the drawings. Whereas these replacing arms may come in contact directly with the slides 58 and 59, it is preferable in practice to provide the slides with adjustable contact points, such as the screws 123, which may be varied in position to effect the necessary relation between the parts to insure the accurate and complete return of the voting elements by the replacing arms. Moreover, in order to insure the proper normal or retracted position of the operated member of each voting element (this being the member by which the motion of the counter is controlled), it is preferable to provide a stop 124, consisting of a screw threaded into the slide 59. (Figs. XXIII and XXIV.)

It will be seen from the foregoing description that the mechanism includes voting elements of the individual and straight-ticket type, counters for registering respectively the number of operations of the voting elements whether in the straight-ticket or single-candidate series, interlocking blocks for preventing the simultaneous operation of two or more voting elements in the same single-candidate series, means for locking the voting elements in their advanced or voted positions in those series devoted to single-ticket, class and minority representation voting, so that a plurality of operations of the same key is prevented, and locking means consisting of the shaft 97, cams 104, stops 105, and projections 106 for locking out the other voting elements throughout a single-candidate series when one voting element of that series has been operated, said parts remaining locked while the voted element remains in its voted position, but being released when the voted element is withdrawn, the releasing movement being accomplished by the spring 110 with which the shaft 97 is fitted. It will be understood, moreover, that whereas in single, class and minority representation voting, the pawls 89 are arranged in their normal or operative positions to engage the notches 92 successively as a key is advanced toward its voted position, and thus prevent retraction after either of the functions of the key has been accomplished (as, for instance, after the interlocking blocks have been spread, after the shaft 97 has been turned to its adjusted position, and finally after said shaft has been returned to its normal position by the engagement of the projection 103 with the cam 100 of the shaft 98, when the two shafts are connected for simultaneous operation by the gears 101, 102) the pawls 89 must be arranged in their adjusted or inoperative positions in those rows (E and F) devoted to cumulative voting, in order to permit the repeated operation of the same key, or the successive operation of different keys; but without means for controlling the operation of the key, it would be possible for a voter after having advanced the key to its full voted position, to withdraw it a short distance and then advance it and by repeating this operation cast more votes or produce a greater number of operations of the counter than he should. In order to prevent advance movement of the key after a partial retraction thereof, and to require a full retraction before the key can receive a succeeding advance movement, the operating member of each voting element is provided with a rack 125 with which coöperates a pawl 126 suitably mounted in the box of the counter, the pawl being capable of transverse yielding movement. A deflecting guard 127 is arranged adjacent to the rack and has an offset portion 128 which, when the key is advanced, engages the free end of the pawl 126, and deflects it laterally so that during the continued advance movement of the key the free end of the pawl occupies a position at one side of the rack, and thus does not interfere with the movement of the key. When the key reaches its wholly advanced position, however, the termination of the guard permits the pawl to resume its normal position in the plane of the rack and with its extremity in engagement with the teeth thereof. The teeth of the rack being beveled on their front sides, will slip idly under the pawl during the retraction, withdrawal or replacement of the key, but should the operator attempt, after partly withdrawing the key, to again advance it, the abrupt rear sides of the teeth of the rack will positively engage the end of the pawl and prevent movement. When, however, the key is entirely withdrawn the deflected portion of the guard will force the extremity of the pawl laterally so that said pawl may resume its normal position, in the plane of the rack, but outside of the guard, as shown in Figs. XXIII, XXXIII and XXXIV. Fig. XXIV indicates the position of these safety locking devices when the key is in its voted position.

For preventing an excessive number of full operations of voting elements devoted to cumulative voting, and also for controlling the number of operations of the same parts in those series devoted to single, class, and minority representation voting, I employ limiting mechanism, and in connection therewith, secondary interlocking devices which serve to prevent the simultaneous operation of two or more voting elements in different single-candidate series which are grouped for class, minority representation, or cumulative voting, and also for preventing simultaneous or successive operation of a straight-ticket voting element and any individual voting element throughout the machine.

The limiting and secondary interlocking mechanisms are constructed as follows: Related with and devoted to each single-candidate series of voting devices is a ratchet member preferably consisting of a disk 129 capable of step-by-step movement in a common direction, and held from excessive forward and from return movement by a retaining pawl 130, and a vibratory operating element, such as a lever 131, fulcrumed concentrically with the disk, (Fig. XIV,) and carrying an operating pawl 132 to successively engage the teeth of the ratchet disk. This operating element or lever 131 is operatively connected with the forward shaft 97 of one of the single-candidate series of voting elements, whereby the operation of any voting element in that series will cause the movement of the lever 131 and the advance through one step of the disk 129. The connection between the shaft and the lever may consist, as illustrated, of a crank arm 133 on the shaft, and a rod 134 connecting said crank-arm with the lever, whereby the movement of the shaft by the advance of the voting key will raise the lever.

Mounted upon the lever is a movable locking member consisting, in the construction illustrated, of an arm 135, which is adapted to coöperate with a fixed locking member consisting of a stop-bar 136. The movable locking member is normally held out of operative relation with the fixed member, by means of the ratchet operating pawl 132, which is provided with a tail or extension 137 slotted to receive a pin 138 on a tail or extension 139 of the arm 135. (See Fig. XIV). The position of the pawl 132 when in engagement with the teeth of the ratchet disk is such as to maintain the locking arm out of operative relation with the stop-bar, but a spring 140 is employed to knuckle the connection between the pawl and the arm when the nose or ratchet-engaging end of the pawl is released. Hence, by mutilating the ratchet disk 129, or providing it with a recess or deep notch 141 at the zero or initial point of its periphery (see Fig. XIV), the engagement of the nose of the pawl therewith will result in bringing the movable member of the lock into engagement with the fixed member thereof, and thus will secure the lever 131 in its depressed position, which in turn, through the medium of the connecting rod 134 and the crank-arm 133, will secure the shaft 97 against movement, and with its cams 99 in the paths of the projections 103 of all of the voting elements in that single-candidate series. Thus, the locking of the limiting lever 131 in its depressed position will lock out all of the voting elements in that single-candidate series which is related with said limiting mechanism. Beginning at the zero point of the ratchet disk, which is indicated by the depression or deep notch 141, the teeth are numbered consecutively in the direction in which the disk is moved by the operation of the limiting lever 131, and the number of steps or movements which can be imparted to the disk, and hence the number of vibrations of the limiting lever, is determined by the number of the tooth with which the pawl 132 is engaged before the first movement thereof. For instance, if the initial positions of the parts, as shown in Fig. XIV, is with the pawl in engagement with tooth No. 3 of the ratchet disk, the first vibration of the limiting lever will turn the disk through the space of one tooth and the return movement of the lever will engage the pawl with tooth No. 2, backward movement of the disk being prevented by the retaining pawl 130. The second operation will result in bringing the operating pawl into engagement with tooth No. 1, and the third operation will carry the disk to such a point that when the limiting lever drops to its normal position the pawl 132 will enter deep notch 141 and the locking arm 135 will engage the stop 136.

In the construction illustrated, all the limiting devices, one of which is devoted to each single-candidate series of voting elements, and one to the straight-ticket row, are mounted on an arbor 142, and on this arbor are revolubly fitted hubs 143, having stepped bearings, and provided at one end, adjacent to the bearing of largest diameter, with an indicator disk 143, peripherally numbered consecutively to indicate the number of steps of which the limiting device is capable. These peripheral numbers show successively through the indicator slot covered by the flap 11 on the outer wall or rear of the casing 9, whereby, as the hub is turned in a step-by-step movement the indicator disk will successively show the number of votes which have been cast by means of mechanism with which said disk is connected. On the bearing step or shoulder 144 (refer to Figs. XVI to XXII), is the operating lever 131, which is free to move independently of the hub. Loosely mounted on the next shoulder or step bearing 145 of the hub is the ratchet-disk 129.

Fitted on the lowermost shoulder or step-bearing 146 of the hub is a gage-disk 147, which is numbered consecutively from zero upward to correspond with the ratchet-disk, said gage-disk being held from axial displacement by any suitable means, and also being held against turning independently of the hub, in order that motion communicated to the hub may rotate the gage disk, and vice versa. In the construction illustrated, the pawl 148 accomplishes this double function of holding the gage-disk against movement independently of the hub, either axially or revolubly, the pawl being pivoted to the gage-disk and extending through an opening 149 in the hub to engage a notch or groove 150 in the arbor 142. A spring 151 yieldingly retains the pawl in engagement with the notch or groove in the arbor. It will be seen that the gage-disk occupies a fixed position with relation to the hub and hence with the indicator disk, and as the ratchet or limiting disk 129 is loosely mounted upon the hub, its position with relation to the gage disk and the indicator disk may be varied, so that when the gage disk is in its normal or initial position, the limiting disk may occupy either a plurality of positions, equal in number to the number of its teeth. Thus in order to provide for any desired number of movements of the limiting lever prior to the locking thereof, it is only necessary to adjust the limiting disk with relation to the gage disk, and this is accomplished in the construction illustrated by a detent 152 pivotally or otherwise mounted on the limiting disk and adapted to be engaged with any one of a plurality of numbered notches 153 in the gage disk. When the detent is engaged, for example, with notch 3 of the gage disk, tooth No. 3 of the limiting disk will be engaged with the operating pawl 132, and, therefore, three movements of the limiting lever will be possible before the limiting device will be locked to prevent further operation of keys in that single-candidate series to which said limiting device is devoted. Any similar adjustment of the limiting disk within the capacity thereof may be effected to allow the desired number of operations, and whereas in the construction illustrated provision is made for only thirty adjustments and a corresponding number of operations of the limiting lever, it will be understood that this number may be increased (or in smaller machines diminished) without affecting the principles above indicated. Moreover, in the normal or initial positions of the parts, the pawl 148, which may be termed an assembling pawl, is engaged in the notch or groove of the arbor, whereas the first operation of the limiting lever, which advances the limiting disk and the gage disk through an interval of one step, will withdraw the assembling pawl out of the notch or groove, because the arbor remains stationary during these operations of the limiting devices. Therefore, after the lock has been operated to check further movements of the limiting lever, it will only be necessary to turn the arbor through one complete revolution in the same direction as the limiting disk has been advanced, and as indicated by the arrow in Fig. XIV, in order to engage the notch or groove with the pawl 148, and then carry the hub, disks and indicator around to the normal or initial position indicated in Fig. XIV, without affecting the relative adjustment of the limiting disk and gage disk. Thus, after a voter has completed his voting operations, and has been locked out, one complete revolution of the arbor 142 will replace all of the limiting devices to their original positions ready for a succeeding voter. This motion of the arbor is received from the replacing shaft 14 when the voter leaves the booth, said shaft being provided with a gear 154 (Fig. IV) meshing with a smaller gear 155 on a vertical counter-shaft 156, and provided with a gear 157 meshing with a gear 158 on the arbor. The relative sizes of the gears 154 and 155 are such that the movement of the turn-stile through an angle of ninety degrees as the voter leaves the booth, and which movement imparts a similar angular movement to the replacing shaft 14, will turn the shaft 156 and the arbor through one complete revolution in the directions indicated by the arrows respectively on said shafts. The fact that the replacing shaft is turned in the opposite direction as another voter enters the booth, and hence turns the shaft 156 and the arbor 142 in a reverse direction, will not affect the positions of the limiting devices, because they are held from backward rotation by the retaining pawls 130, but if preferred it is obvious that a clutch may be used in connection with either of the gears 154 to 158, to avoid this reverse rotation. It has been deemed unnecessary to illustrate such a device.

Inasmuch as the shafts 97 and 98 are mounted upon the depressible releasing frame in order to disengage the cams thereof from the voting elements to permit replacement of the latter, it is necessary to mount the arbor of the limiting devices for similar movement, on account of the rod connections 134 by which motion is communicated from the shafts 97 to the limiting levers, and hence I provide a vertically-movable frame consisting of side bars 159 connected at their lower ends with the yoke levers 85 which control the movements of the releasing frame and are controlled in turn by the replacing shaft 14, said side bars being connected by frame members 160, which may be of any suitable or preferred construction, and which unite the upper ends of said side bars with the uprights 83 of the releasing frame. The arbor 142 is mounted on the frame members 160 and the stop 136 is carried by the releasing frame. Inasmuch as the replacing shaft is mounted in stationary bearings, the relative movement of the arbor 142 is permitted by slidingly mounting the hub 161 of the gear 157 on the upper end of the shaft 156, providing said sleeve with a slot in which operates a pin 162 on the shaft, and holding said gear yieldingly in mesh with the gear 158 by a spring 163. When the arbor is depressed with the releasing frame, the gear 157 is correspondingly depressed, but immediately resumes its normal position, when the arbor is returned to its normal position, and thus remains permanently in engagement with the gear 158. In such single-candidate series, as D, as are devoted to single-ticket voting, and in the straight-ticket row or series of counters, only one operation of one key is permitted, and, therefore, the limiting devices belonging to those series or rows must be adjusted as indicated in Fig. IX, with the limiting disk arranged in such relation to the gage disk that the operating pawl of the limiting lever will be in engagement with tooth No. 1 of the limiting disk prior to the voting operation of any voter, or after the machine has been reset by the exit of a prior voter from the booth, so that the operation of any voting element of a series connected with said limiting device will result in locking the limiting lever and preventing subsequent operation either of the same or any other voting element in that series. On the other hand, when a plurality of single-candidate series are grouped for class voting, as for presidential electors, see rows A, B and C, and each voter is permitted to cast three votes in the group, whether selected from the candidates nominated by his own party or any other party in the field, the limiting devices connected respectively with the grouped series of voting elements must be adjusted to permit three vibrations of the limiting levers. It is obvious, however, that if the operation of each limiting device is independent of the operation of either of the other limiting devices connected with the other series in the group of voting elements, each voter could operate three voting elements in each single-candidate series, and hence in order to prevent such improper manipulation of the machine it is necessary to group or couple the limiting devices connected with the grouped series of voting elements so that the operation of a voting element in either of the series which are thus arranged in a group will advance all of the coupled or grouped limiting devices, so that when the third vote has been cast the limiting devices of all of the grouped single-candidate series will be locked against further operation, to thus lock the voting elements. This is accomplished by coupling devices consisting of washers 164 (Figs. XXI and XXII) which are split or cut away at one side to drop over the arbor 142, and are fitted between the adjacent ends of the hubs 143 belonging to the limiting devices which are to be coupled, said washers having lateral pins 165 which respectively take into sockets 166 in the adjacent ends of the hub. Referring to series A, B and C which in the drawings are shown adjusted for class voting, one of these coupling washers is fitted between the hubs of limiting devices A and B, and another is fitted in the hubs of limiting devices B and C, whereby when the voting element in the rows A, B and C is actuated it will advance the limiting devices A, B and C one step. The operation of any other voting element in the same series will advance said limiting devices a second step, and the operation of a third voting element in the grouped series will advance the limiting devices a third step, and immediately the pawls 132 of the limiting devices which are not operated by the movement of the third voting element, and whose limiting levers, therefore, have not been raised, will drop into the deep notches of the limiting disk and thus lock those limiting devices against subsequent movement when the operated limiting lever has reached its elevated position. As soon, however, as the advance movement of the voting element has been completed so as to lower the limiting lever to its initial or normal position, the pawl of that lever will drop into its deep notch, and thus complete the locking of the entire series of limiting devices and voting elements. In minority representation voting the same adjustment of the limiting devices is employed, to wit, the limiting disks are adjusted to permit the lawful number of operations of the voting elements. If three candidates are placed in the field by a party and but two offices are to be filled, each voter being entitled to cast two votes for that office, the limiting devices will be set to permit two movements prior to locking, and the limiting devices devoted to the series of voting elements which are set for minority representation voting are coupled, as above described, for simultaneous operation.

For cumulative voting, see rows E and F, the adjustment of the parts of the voting elements may be such as to permit the voter to split his vote. For instance, if there are two candidates in the field by one party and only one by another party, each voter being permitted to cast two votes, the limiting devices devoted to those series set for cumulative voting must be coupled so as to permit only two operations. If there are three officers to be elected, and three candidates have been placed in the field by a party, the voter is entitled to cast three votes, but he may distribute them as he prefers, and cast one vote for each candidate, one and one-half votes for each of two candidates, or three votes for one candidate. In order to do this it is necessary that he shall have the privilege of withdrawing the voting element after having advanced it to its voted position. This is possible, see Figs. XXXI and XXXII, by rendering inoperative the key-locking pawl 89, as hereinbefore explained, and which in other forms of voting is employed to prevent the withdrawal of a key after it has received a voting movement. However, when there is an uneven number of candidates and offices, and when it is desired to permit the voter to split his vote and distribute it as preferred, the adjustment of the parts of the voting elements belonging to the series grouped for cumulative voting must be such that each operation of a voting element will register but a one-half vote. This is done by effecting the rear adjustment of the pin 65 on the slide 59, as above explained, but a corresponding adjustment of the limiting devices connected with these series of voting elements must be effected by setting the limiting disks of said limiting devices to permit six operations thereof. After each advance movement of the key 58, it may be withdrawn manually, and the operation repeated until the allowed number of operations have been accomplished, when the limiting devices devoted to the rows assigned to cumulative voting will prevent further operation of the same or other keys in the group by locking the shafts 97 against movement. The return of the operated member or slide 59 in the series devoted to cumulative voting is effected by means of a return spring 167, one of which is arranged in each counter box, and is provided with a handle or lever 168 having a catch 168$^a$ to engage the wall of the box or other fixed object, as shown in Fig. XXXI, and in dotted lines in Fig. XXV. The free end of this spring bears against a depending stud 169 on the slide 59, see Fig. XXXII. On opposite sides of and between the hubs of those limiting devices which are devoted to single-ticket voting, there is arranged a washer 170, Fig. XX, which is also split to fit over the arbor, and is provided with an arm or extension 171 to bear on a bar 172 suitably mounted in the casing and preferably carried by the frame which supports the arbor of the limiting devices.

Thus far, mechanism has been described for preventing simultaneous operation of two voting elements in the same single-candidate series, but it is also necessary to provide the similar operation of the voting elements in different single-candidate series, the means for accomplishing the same being termed secondary interlocking mechanism, and being adapted, in connection with the main interlocking devices, consisting of the blocks 95, to prevent any two voting elements of the machine, inclusive of the straight-ticket voting elements, from being simultaneously operated, while permitting successive operation of the voting elements subject to the limiting devices and other locking means. In the construction illustrated, the secondary interlocking mechanism embodies flexible runners 173, consisting of cords, chains, wires, or any equivalent thereof, extended through guides formed in hangers 174, and also extending through openings 175 in the limiting levers, said runners being provided with stops 176 adjustably secured thereto in such positions with relation to the fixed guides that the slack of the runner is just sufficient to allow the movement at one time of a single element. Thus, when the limiting levers of rows A, B and C are set for class voting, and the runner 173 is associated therewith as described, the interval between the terminal stops 176 and the adjacent guides will permit either of the levers thus connected to be moved to its elevated position by the operation of a voting element, but by so doing the runner is drawn taut, and, therefore the operation of any other lever in this group is prevented until the operated lever is returned to its normal position and has relaxed the runner. In this way any desired number of the limiting devices may be grouped to prevent simultaneous operation of any two levers, or if desired all of the levers may be thus limited in movement. The construction of the preferred form of stop is shown in detail in Fig. LV, the same consisting of a split block through which the runner passes, said block being secured at the desired adjustment, to allow the required movement of one lever, by means of a set screw 177.

In the construction illustrated in Fig. XIII a second runner is employed to connect the limiting levers of rows E and F. Moreover, a single runner 178 is engaged with all of the limiting levers, with the exception of the straight-ticket lever and also passes through all of the guides in the hangers 174, one end of this second runner being provided with a stop 176, which is adjustable as above described, while the other end of the runner as shown clearly in Fig. XIV, is connected with an arm 179 on a rock-shaft 180. This second runner is adjusted so as to allow no slack, whereby when either of the limiting levers, with the exception of the straight-ticket lever, is operated, and the runner 178 is strained, the arm 179 will be moved to the dotted line position shown in Fig. XIV, and thus will turn the rock-shaft 180, and elevate a series of lock arms 181 fixed on said rock-shaft into the paths of lock-arms 182 loosely mounted on the shaft 60 and respectively carried by the straight-ticket levers 24, the lock arms 182 (there being one for each of the limiting devices A to F inclusive) having seats 184 to receive the extremities of the lock-arms 181. In the hub of the arm 179 is formed a notch 185 for engagement by a pawl 186 having an actuating spring 187, and hence when the limiting lever connected with the shaft 97 of any of the single-candidate series of voting elements is operated, the runner 178 moves the arm 179 to its dotted line position, Fig. XIV, where it is locked by the pawl 186. This leaves the runner 178 loose to permit successive operation of other limiting levers, subject to the restraint of the runner 173 and other locking and interlocking devices of the mechanism, but the lock arms 181 by being secured in the dotted line position in the paths of the arms 182, lock all of the straight-ticket levers against operation. Hence, after an individual voting key has been operated neither of the straight-ticket levers can be operated until the machine has been reset. Similarly, when a straight-ticket lever is operated, the lock arms 182 on the shaft 183 are brought into locking engagement with seats 188 in the locking-arms 181, as also shown by dotted lines in Fig. XIV, and thereby the arm 179 is secured in its full line position, the runner 178 is held taut, and all of the limiting levers through which the runner 178 extends are locked against operation. Under certain conditions, however, as in minority representation voting, when it is impossible to use the straight-ticket voting element to vote for two selected candidates (for instance) when three have been nominated, it is necessary that the limiting levers connected with those single-candidate series which are devoted to minority representation voting shall not be limited in movement by the runner 178, and hence each limiting lever is provided with a displaceable block 189 (see Fig. LVI) having a guide opening 190 through which the runner 178 extends, said block being secured in place in any suitable manner, as by a screw 191. The block fits in a notch or cut-away portion of the lever, and the blocks of those levers connected with series devoted to minority representation voting are removed, to permit operation of said levers and hence of the voting elements controlled thereby after a straight-ticket voting element has been operated.

Connected by a link 192 with an arm 193 of the pawl 186 is a release pin 194 having a stud 195 in the path of a projection or guide 196 on the releasing-frame 83, whereby when the releasing frame is depressed by the movement of the turn-stile to permit exit from the booth, the pawl 186 is disengaged from the hub of the arm 179 to permit the interlocking elements to return to their full line positions shown in Fig. XIV. It will be understood that return movement of the locking arms 182 from their dotted to their full line positions prior to the operation of the turn-stile, is prevented by the pawls 89 which engage the slides 58 of the straight-ticket row, said slides being advanced to their voted position when the straight-ticket levers are operated, by means of the straight-ticket bars 61. Two or more straight-ticket levers may not be operated at the same time, because of the series of interlocking blocks 95. Hence, when a straight-ticket lever has been operated it locks all of the individual voting elements except those devoted to minority representation voting, which have been left free by the removal of the runner blocks 189, the number of movements of the keys in the series devoted to minority representation voting being controlled by the limiting devices hereinbefore described; and on the other hand, when an individual voting element in any other than the series devoted to nimority representation voting, is actuated, all of the straight-ticket voting devices are locked against operation.

In order to control the manipulation of the machine by restricted voters, or those who are restricted by law from voting on certain questions or propositions, and for candidates for certain offices, while permitting them to vote on other questions and for other offices, I employ restricting mechanism, which is constructed as follows: Arranged on the spindle of the turn-stile is a segmental or mutilated gear 197, Fig. L, disposed in operative relation with a rack 198 on a rod 199 which is mounted to slide in suitable guides on the booth, and is connected with a lever 200 fulcrumed at an intermediate point and connected by means of a bar 201 and a link 202 with a crank-arm 203 on a rock-shaft 204 Figs. V and VII. This rock-shaft is connected by bevel gearing 205, a counter-shaft 206 and bevel gearing 207 with a rock-shaft 208 carrying a series of restricting arms 209 equal in number to and respectively in the planes of the limiting levers 131. Each of these arms is provided with an adjustable slotted extension 210 engaged by a set screw 211 and a guide pin 212 (Fig. LVII). When these extensions are retracted as indicated in Figs. VII and IX, and the restricting arms are depressed by the turning of the rock-shaft 208, the upward movement of the limiting levers is not affected, but the outward adjustment of the extension on one of these restricting arms (as shown in Fig. XIV) arranges it in such position that when the rock-shaft 208 is turned to depress the arms, said extensions will rest on top of the limiting arms in the plane thereof, and hence will lock such limiting arms against movement, and thereby will lock out that row of voting elements with which said limiting arm is connected, see dotted lines in said figure. Prior to the opening of the polls those extensions which relate to limiting levers 131 connected with shafts 97 of series of voting keys devoted to candidates for an office for which a restricted voter may not vote, are extended, and hence when the restricted voter enters the booth at the side of the turn-stile allotted to her, and thereby turns the stile in the opposite direction from that in which it is turned by the entrance of an unrestricted voter, the segment 197 by operating on the rack 198 draws the rod 199 in the direction indicated by the arrow in Fig. I, and thus through the intermediate connections, turns the rock-shaft 208 to depress all of the restricting arms 209, thus locking against movement any limiting levers over which the extensions 210 may lie, while the remaining limiting levers are free to move, and thus permit the restricted voter to cast votes for the candidates for any offices to which the restriction does not extend. Also carried by the rock-shaft 204 is a gear 213 (Fig. LX) meshing with a rack 214 on a slide 215 having guides 216 arranged in pairs, one pair for each pair of voting elements devoted to propositions. In these guides are arranged lock-out pins 217 adapted, when in one position, to engage openings in locking blocks 218. These blocks are mounted for vertical movement on a fixed member 219 of the casing, and are provided with ears 220, which, in the normal positions of the blocks 218, are out of the paths of stop pins 221 on the voting keys of the proposition column. Prior to the election the pins 217 which relate to those propositions for which the restricted voter may not vote, are moved into engagement with the blocks 218, and when a restricted voter enters the booth and operates the draw-bar 199 as above described, to turn the rock-shaft 204, the slide 215 is elevated, and carries with it those blocks 218 which are connected by the advanced pins 217 to the slide, and thereby the ears 220 of said blocks are arranged in the paths of the pins 221 on the voting keys devoted to that proposition.

It is desirable, in order to prevent fraud or detect it if committed, and also to prevent inaccuracies of the machine from remaining undetected, to provide, in addition to the vote counters, which are assigned respectively, to the individual and straight-ticket voting elements, such total counters as will indicate, first, the total number of persons admitted to the booth, whether they vote or not, second, the total number of persons who actually vote, or who cast one or more ballots, third, the total number of unrestricted voters, and, fourth, the total number of restricted voters; and in addition thereto, to provide office total counters whereby the total number of votes cast for all of the candidates for each office shall be indicated, all of these total counters being accessible from the exterior of the machine, so that the officers of the election may inspect them at any time during the progress of the election. The specific construction of the total counters 221 and 222, which are assigned respectively to register the total number of persons admitted to the booth, and the total number of actual voters, forms no part of my present invention and may be constructed in any suitable or well known manner, the operation of the counter 221 being controlled by the replacing shaft 14 which is provided with a crank-arm 223 connected by a link 224 with a counter-actuating plunger 225 (Figs. IV and X). Mounted on a suitable Y-frame 226 (Fig. LIX) located within the casing is a lever 227 connected with the actuating plunger 227ª of the total voter counter 222, said lever 227 being pivoted at the opposite end to an arm 228 on the bar 112, which is actuated by the first voting element operated by an occupant of the booth, and which, as hereinbefore described, raises the indicator 111 to indicate that the occupant has cast a vote. This bar 112 receives its motion from an operated voting element through the medium of either of the shafts 97, the crank-arm 115 and the related pin 114. Even should the first and only vote cast by an occupant of the booth be that relating to a proposition or question, the same result and the above-mentioned actuation of the total-voter counter will be accomplished, by reason of crankshafts 229 suitably mounted in the casing and having crank-arms 229ª engaged by pins 229ᵇ carried respectively by the keys devoted to the amendment column. Said shafts also have cranks 230 engaging pins 230ª on the bar 112, whereby when an amendment key is voted the bar 112 is raised.

The specific construction of the total counters 231 and 232 for restricted and unrestricted voters may also be of any suitable or preferred construction, provided with actuating plungers 233 and 234, each of which is provided with a seat or socket for the adjacent end of a shift-pin 235, the length of said pin being such, however, that it can be engaged with only one of the plungers at a time. This shift-pin is carried by a lever 236 connected with the bar 201, hereinbefore described, and the normal position of the shift-pin being that indicated in Figs. V and X wherein it is in engagement with the plunger 234 of the unrestricted counter. Also connected with this shift-pin is a lever 237 pivoted at the end opposite to the shift-pin upon the arm 228 of the bar 112. When an unrestricted voter enters the booth the operation of the first voting element is registered on the total voter counter and also on the total unrestricted counter, because the shift-pin 235 is normally in engagement with the plunger 234, and when a restricted voter enters the booth and thereby actuates the draw-bar 199 to shift the pin 235 into engagement with the plunger 233, the operation of the first voting key is registered on the total voter counter and also on the total restricted voter counter.

The total office counter, which is shown in plan view in Fig. X (the superjacent total restricted counter being broken away for that purpose) and also in Figs. VII, IX, XI and XII, and in detail in Figs. XL to XLV, is provided with a casing 238 divided into suitable compartments, one for each single-candidate series of counter-actuating devices, and respectively containing counters actuated by levers 239 fulcrumed at intermediate points and having their forward ends disposed in the paths of cams 240 carried respectively by the shafts 97, but spaced therefrom a distance sufficient to prevent operative contact of the cams with the levers 239 when the shafts 97 are depressed with the releasing frame in the act of resetting the mechanism, see Figs. IX and XL. The preferred construction of counter embodies an arbor 241 having a terminal seat 242 for resetting purposes, a series of tally dials 243, 244 and 245 of which the peripheral graduations are visible through suitable inspection openings covered by the above-described flap 12 on the exterior wall of the casing; ratchet disks 246 respectively attached to the dials and arranged respectively in the paths of teeth 247, 248 and 249 of a vibratory pawl 250 carried by a pawl frame 251 which is mounted for oscillatory movement upon the arbor, said plural-toothed pawl being pivotally mounted in the pawl frames and being actuated to hold its teeth in operative relation with the ratchet by means of a spring 252. The actuating lever 239 is disposed in such relation to the pawl frame as to raise the latter and thus impart motion through the tooth 247 to the units dial 243. The teeth of the pawl 250 are disposed at an angle to each other, whereby when the units tooth is in engagement with the ratchet of the dial 243, the other teeth are held out of engagement with their respective ratchets. At its initial or zero point the periphery of the ratchet is recessed or cut away, as shown at 253, whereby when the operating tooth is in registration therewith it is allowed to drop sufficiently to allow one of the other teeth to come in contact with its respective ratchet. Thus, when the operation of the pawl frame has been repeated sufficiently to register 9 and has been dropped to its normal position to allow the tooth 247 to drop into the notch or recess 253, the tens tooth 248 is brought into operative engagement with the ratchet of the tens dial, whereupon the next upward vibration of the pawl frame advances the units and tens dials simultaneously to register 10. Upon the return of the pawl frame to its normal position, however, the units tooth is again brought into operative relation with the teeth of the ratchet of the units dial, and the operation progresses as before. When in this way both units and tens dials have been advanced until they both register 9, the return movement of the pawl frame to its normal or depressed position causes both the units and tens teeth 247 and 248 to drop into their respective recesses in the ratchet of the units and tens dials, and thus bring the tooth 249 of the hundreds dial into operative engagement with its ratchet, and the succeeding upward movement of the pawl frame advances the hundreds dial to 1 and the units and tens dials to zero, and at the same time restores the units tooth to operative engagement with the ratchets of the units dial (it will be understood that the number of dials may be increased as desired.) A retaining pawl 254 is employed in relation to each ratchet to prevent backward rotation of either of the dials, and each ratchet is provided with a spring-actuated pawl 255 for engagement by a groove 256 in the arbor 241, whereby in resetting the machine after the conclusion of an election, it is only necessary to turn the arbor in the direction indicated by the arrows (Figs. XLI to XLV) to assemble the various dials and return them to zero.

As all of the counts in the party column, except those devoted to minority representation voting, are advanced by the operation of a straight-ticket lever, the corresponding advance of the office counters is accomplished by means of a universal bar 257 provided with a series of pins 258 respectively in engagement with the pawl frames 251, and connected at its upper end with a lever 239 arranged in the path of a cam 240 on the shaft 97 of the straight-ticket series of counters.

In order to prevent the repeated operation of an office counter in cumulative voting, and insure the operation thereof only by the first key operated in the single-candidate series to which it relates, I prefer to employ means for holding the lever 239 in its operated or voted position until positively returned by replacing means, and a simple and efficient manner of accomplishing this object is to provide each lever with a pivot consisting of a friction screw 259 engaging the post 260 and adapted to be tightened sufficiently to hold the lever in its adjusted position. One of the side arms of each pawl frame is extended to form a tail 261 beneath which is arranged a pin 262 on a replacing bar 263, and connected at its lower end with an arm 264 extending from the replacing shaft 14 (Fig. IX).

In class voting, when desired, the office counters relating to all of the single-candidate series with the exception of one may be removed (when it is desired to indicate on the total office counter only the first vote cast in the group), and a connecting bar 265 may be connected, as shown in Fig. XL, with the pawl frame 251 of the counter which is employed, and provided with pins 266 for engagement respectively by levers 239. In this case also the friction devices for the levers 239 should be set to prevent return movement of the levers until positively actuated by the resetting devices consisting, as above described, of the bar 263 actuated by the replacing shaft 14.

For the amendment and proposition column, and also in cases where the variety of adjustment hereinbefore described is not required, the simplified form of counter illustrated in Figs. XLVI and XLVII may be employed, the construction thereof corresponding with that described in connection with the total office counters, in so far as the construction of the plural-toothed pawl, pawl frame, dials and related parts are concerned. In this construction motion is communicated to the spindle 51 by means of the pinion 52 actuated by a rack 267 carried by the counter-actuating device 268, said spindle carrying the intermeshing gears 50 and 48, of which the latter is provided with a pin 49 engaged with the pawl frame. It will be seen that the pinion 52 is positively turned in opposite directions by the voting and return movements of the key. The same means of adjustment for the contacts 65 and 73, as described in connection with the preferred form of counter-actuating devices, may be employed.

In the construction illustrated, the arm 264 by which the resetting bar 263 is actuated, see Fig. XII, is provided with a slotted hub 269 in which operates a pin 270 on the replacing shaft 14, said slot allowing lost motion to avoid excessive movement of said bar 263. Also, to prevent return movement of the replacing shaft by an attempted reversal of the movement of the turn-stile after the latter has been partly turned to permit the exit of a voter, I employ a full-stroke controlling device consisting of a pawl 271 and a ratchet 272, arranged in operative relation, and one being carried by the shaft 14 (Figs. LI and LII). In the construction illustrated, the ratchet is carried by a shaft and the pawl is fixed to a stationary object with its free end in operative relation with the rack and mounted to yield laterally when deflected by the cam 273 at the end of a guard 274. When a voter enters the booth the movement of the shaft in the direction indicated by the arrow in Fig. LI causes the lateral deflection of the free end of the pawl, and when the turn-stile reaches the limit of its movement in that direction the pawl is released and resumes its position in the plane of the ratchet, and at the upper end thereof. When movement of the turn-stile in the opposite direction is effected by the voter in leaving the booth, the pawl slips idly over the ratchet until again released at the lower end thereof to resume its normal position outside of the guard. If, however, the voter, after partly turning the turn-stile to leave the booth, attempts to return, and at the same time restore the turn-stile to its former position, such movement will be checked by the pawl engaging the teeth of the ratchet.

The indicators 143 are arranged to expose their peripheral numerals through the inspection openings 275 in the outer or rear wall of the casing, the same being normally covered by the flap 11 which is adapted to be raised by an officer of the election to disclose the positions of the various indicators, and in the initial positions of the parts of the voting mechanism the zero marks of all of these indicators are exposed through the inspection openings, the indicators being returned to expose such zero marks by the movement of the turn-stile to permit the exit of a voter after the completion of the voting operation. As each voter registers his vote, therefore, these indicators are advanced step-by-step to successively expose the numerals through the inspection opening, and whereas these indicators do not disclose for what party a voter has cast his vote or for what candidates the votes have been cast, they indicate respectively the offices for which votes have been cast by the occupant of the booth. Obviously, those indicators which are assigned to single-candidate series in which but one vote is permitted, the position of that indicator after the completion of the operations of a voter will indicate one, whereas those indicators which are related with single-candidate series arranged for class voting, will indicate the number of votes which have been cast in that class or group, all of the indicators in the same group disclosing the same numeral, and thus enabling an officer of the election to determine whether the occupant of the booth has cast the entire number of votes to which he is entitled in a class, and whether he has voted for candidates for all of the offices which his franchise permits. The advantage of this construction and arrangement of parts resides in the fact that if a voter, not satisfied with the candidates selected by his and other parties for a certain office, desires to cast an independent ballot, it is only necessary for him, without leaving the booth, to call upon an officer of the election for an independent ballot to be passed in to him so that he may deposit it in a suitable receptacle provided for that purpose, but forming no part of my present invention, and hence not illustrated. It may be of the ordinary or well known construction. As each ballot is made out to provide for casting votes for any and all offices comprehended by the election, and as a voter should not be permitted to cast a vote by means of the independent ballot for any office for which he has already cast a vote by means of the machine, it is necessary that the officer who furnishes the voter with an independent ballot shall know beforehand for what offices that voter has cast votes on the machine, and to cancel the independent ballot in such a way that any attempt on the part of the voter to duplicate a vote already cast may be detected. Therefore, when a voter calls for an independent ballot, an officer of the election first raises the flap 11, and referring to the independent ballot, which is illustrated in Fig. LIII, punches those sections of the independent ballot which correspond with the offices shown by the indicators to which operated indicators relate. For instance, referring to the independent ballot, and assuming that the officers to be elected are as shown on said ballot, if the indicators of the machine show that those relating to the governor, lieutenant governor, State auditor, and mayor have been operated, a punch or suitable indelible mark 276 must be applied to cancel those parts of the ballot; if the members of assembly, of which three are indicated on the independent ballot, are arranged for cumulative voting, and if the indicators connected with those single-candidate series devoted to members of assembly show that the voter has cast one and one-half votes for members of assembly, and, therefore, is not entitled to vote an independent ballot for the one and one-half votes that he has already cast upon the machine, the officer punches that series of spaces on the independent ballot to indicate that he has cast one and one-half votes, as shown at 277. Whereby in counting the independent ballots this ballot will be given credit for only one and one-half votes toward the offices of the members of assembly. To facilitate this operation, one of the spaces assigned to the members of assembly is provided with markings indicating $\frac{1}{2}$ and 1, the next space is marked to indicate $1\frac{1}{2}$ and 2, and the next space $2\frac{1}{2}$ and 3. If four of the single-candidate series are devoted to the office of constable, and the indicators of the machine show that two of them have been voted, those spaces of the independent ballot which are marked respectively one and two are punched, as shown at 278, thus leaving only two spaces in which valid votes can be cast.

It is obvious that the construction and arrangement of the independent ballot may be varied to suit the condition of election in connection with which it is to be used. The voter may supply the desired names in any of the unpunched spaces. Moreover, it is not necessary when a great number of names are on a ballot, as in voting for presidential electors in a State entitled to a large number of these officers, to punch out all of the spaces of the series that have been voted. It is sufficient to have these different spaces numbered, and to punch that space which corresponds with the number already voted on the machine. For instance, in the spaces on the ballot indicated in Fig. LIII for the office of constable, it would be sufficient, inasmuch as two votes for this office have been cast, to punch space number two. Only those spaces designated by higher numbers than the one punched may be used in voting the independent ballot.

Obviously, those indicator dials which are designed for use in connection with single-candidate series to be adjusted for cumulative voting, should be marked in half numbers, as, for instance, 4, 4½, 5, 5½, etc., so that the indicators will correspond exactly with the vote counters.

Having thus described my invention what I claim is:—

1. In a voting machine, the combination with counters, of counter-actuating devices having adjustable stops for determining their initial or normal positions, and a common replacing mechanism for engaging one set of said stops and returning the actuating devices to their normal positions.

2. In a voting machine, the combination with counters, of counter actuating devices having operating and operated elements, contact members for communicating motion from one to the other, adjustable stops carried by both members, and replacing mechanism for engaging said stops and returning said members to their normal positions.

3. In a voting machine, the combination with counters, of counter actuating devices including operating and operated elements, contact members for communicating motion from one to the other, one of said contact members being adjustable relatively to the other to thereby vary the stroke of the operated element, independently adjustable contact points on both elements, and a replacing mechanism for engaging said contact points and restoring said elements to normal position.

4. In a voting machine, the combination with counters, of counter-actuating devices, replacing mechanism for said devices, and independently adjustable contact points on the counter-actuating devices for engagement by the replacing mechanism.

5. In a voting machine the combination with counters, of manually operable counter-actuating keys, means for locking said keys in repressed voting positions, a key releasing means, key replacing and locking mechanism including a rocker shaft, rocker arms carried by said shaft and normally out of engagement with the keys to permit free voting movement of the latter, and an operating means for first releasing the keys and then actuating the rocker shafts to restore said keys to normal position.

6. In a voting machine, the combination with counters and counter actuating devices, said counter actuating devices each comprising an operating and operated element, of replacing mechanism having rock shafts and rocker arms carried by said shafts for engagement with both the operating and operated elements, and means for actuating said rock shafts.

7. In a voting machine, the combination with counter-actuating devices and a turnstile having open and closed positions, of replacing mechanism having rock-shafts provided with arms for replacing and locking engagement with the counter-actuating devices, and means between the turn-stile and the rock-shafts for communicating positive motion in opposite directions to the latter to cause the swinging movement of the arms to respectively lock and release the counter-actuating devices.

8. In a voting machine, the combination with counter-actuating devices, and movable means for controlling access thereto, of replacing mechanism having rock-shafts carrying arms for engagement with the counter-actuating devices, a replacing shaft geared to the rock-shafts and operatively connected with said means for controlling access to the counter-actuating devices, and means for controlling full-stroke movements in opposite directions of the replacing shaft.

9. In a voting machine, the combination with counter-actuating devices, and movable means for controlling access thereto, of replacing mechanism having rock-shafts carrying arms for engagement with the counter-actuating devices, a replacing shaft geared to the rock-shafts and operatively connected with said means for controlling access to the counter-actuating devices, and means for controlling full-stroke movements in opposite directions of the replacing shaft.

10. In a voting machine, the combination with counter-actuating devices and means for controlling access thereto, of limiting mechanism having operating members operatively connected with the counter-actuating devices, and operated members adapted to receive a step-by-step movement in a uniform direction, means for locking the operating member when the initial point of the operated member reaches a predetermined position with relation to the operating member, and resetting devices for the operated members actuated by said means for controlling access to the counter-actuating devices.

11. In a voting machine, the combination with counter-actuating devices and means for controlling access thereto, of limiting devices having operating members operatively connected with the counter-actuating devices and operated members adapted for step-by-step movement in a uniform direction, means for locking the operating members when initial points of the operated members reach predetermined positions, an assembling arbor for the operated members, and connections between said arbor and the means for controlling access to the counter-actuating devices.

12. In a voting machine, the combination with single-candidate series of counter-actuating devices, of total office counters having operated indicating members, and operating members operatively connected respectively with the series of counter-actuating devices.

13. In a voting machine, the combination with single-candidate series of counter-actuating devices, of total office counters having operated indicating members, and operating members operatively connected respectively with the series of counter-actuating devices, and means for effecting simultaneous movement of a plurality of the operated indicating members.

14. In a voting machine, the combination with single-candidate series of counter-actuating devices, of office indicators having operated indicating members, and operating members operatively connected respectively with the series of counter-actuating devices, and locking means for uniting a plurality of operated indicating members in series to effect simultaneous movement thereof by the operation of either of the operating members of said series.

15. In a voting machine, the combination with single-candidate series of counter-actuating devices, of total office counters, and means actuated respectively by the counter-actuating devices of said series for advancing said counters.

16. In a voting machine, the combination with series of counter-actuating devices, of total office counters, levers for respectively actuating said counters, and rock-shafts respectively common to the single-candidate series of counter-actuating devices, and provided with means for actuating said levers.

17. In a voting machine, the combination with series of counter-actuating devices, of total office counters, levers for respectively actuating said counters, and rock-shafts respectively common to the single-candidate series of counter-actuating devices, and provided with cams for respective actuation of said levers.

18. In a voting machine, the combination with single candidate series of counter-actuating devices, of total office counters, rock-shafts common respectively to the counter-actuating devices of the several series, connections between said rock-shafts and the counters, and friction devices for holding said connections in their adjusted or operated positions.

19. In a voting machine, the combination with single-candidate series of counter-actuating devices, of total office counters having swinging pawl frames, levers for actuating said pawl frames, friction devices for securing said levers in their adjusted or operated positions, and rock-shafts common respectively to the counter-actuating devices of the several single-candidate series, and having cams for actuating said levers.

20. In a voting machine, the combination with single-candidate series of counter-actuating devices, of total office counters having swinging pawl frames, a plurality of motion communicating means common respectively to and movable by the counter-actuating devices of the several series, and a link connected with one of the pawl frames and common to a plurality of said motion communicating means.

21. In a voting machine, the combination with single-candidate series of counter-actuating devices, of total office counters having movable actuating elements, means for communicating motion from the counter-actuating devices of each single-candidate series to the actuating element of one of the total office counters, replacing devices for the counter-actuating devices, and means actuated by the replacing devices for returning the actuating elements of the total office counters to their normal positions.

22. In a voting machine, the combination with a straight-ticket and single-candidate series of counter-actuating devices, of total office counters having actuating elements, means for communicating motion from the counter-actuating devices of each single-candidate series to the actuating element of one of the total office counters, and means for communicating motion from the straight-ticket counter-actuating devices to a plurality of the actuating elements of the total office counters.

23. In a voting machine, the combination with counter-actuating devices, limiting devices having operating and operated elements, connections between the counter-actuating devices and the operating elements, and a common arbor for the operated elements, of replacing devices for the counter-actuating devices consisting of a replacing shaft and connected rock-shafts having arms for engagement with the counter-actuating devices, and connections between the replacing shaft and said arbor whereby the latter is returned to reset the limiting devices when the rock-shafts are operated to replace the counter-actuating devices.

24. In a voting machine, the combination with counter-actuating devices, limiting devices having operating and operated elements, a common resetting shaft for the operated elements, and connections between the counter-actuating devices and the operating elements, of replacing mechanism having a replacing shaft and connected rock-shafts having arms for returning the counter-actuating devices to their normal positions, and connections between the replacing shaft and said arbor whereby a complete revolution is imparted to the arbor when the rock-shafts are actuated to replace the counter-actuating devices.

25. In a voting machine, the combination with counter-actuating devices, locking means for the same, limiting mechanism having operating and operated elements, and means operated by the counter-actuating devices for communicating motion to the operating element, of a releasing frame operatively connected with said locking means and carrying the operated elements of the limiting mechanism, replacing devices having means for returning the counter-actuating devices to their normal positions, connections between the replacing mechanism and the releasing frame, and means for communicating resetting motion from the replacing devices to the operated elements of the limiting mechanism.

26. In a voting machine, the combination with counter-actuating devices, locking means for the same, limiting mechanism having operating and operated elements, and means operated by the counter-actuating devices for communicating motion to the operating element, of a reciprocable releasing frame connected with said locking means and carrying the operated elements of the limiting mechanism, replacing devices having a replacing shaft and means actuated thereby for returning the counter-actuating devices to their normal positions, connections between said replacing shaft and the releasing frame, and connections for communicating motion from the replacing shaft to the operated elements of the limiting mechanism, said connections having a yielding element for movement with the releasing frame.

27. In a voting machine, the combination with counter-actuating devices, locking means for the same, limiting mechanism having operating and operated elements, and means operated by the counter-actuating devices for communicating motion to the operating element, of a reciprocable releasing frame connected with said locking means and carrying the operated elements of the limiting mechanism, replacing devices having a replacing shaft and means actuated thereby for returning the counter-actuating devices to their normal positions, connections between said replacing shaft and the releasing frame, and connections for communicating motion from the replacing shaft to the operated elements of the limiting mechanism, said connections including a motion transmitting element movable with the releasing frame.

28. In a voting machine, the combination with counter-actuating devices, locking means for the same, limiting mechanism having operating and operated elements, and means operated by the counter-actuating devices for communicating motion to the operating element, of a reciprocable releasing frame connected with said locking means and carrying the operated elements of the limiting mechanism, replacing devices having a replacing shaft and means actuated thereby for returning the counter-actuating devices to their normal positions, connections between said replacing shaft and the releasing frame, and connections for communicating motion from the replacing shaft to the operated elements of the limiting mechanism, said connections including a yielding gear movable with the releasing frame, and a spring for maintaining said gear in its normal position.

29. In a voting machine, the combination with counter-actuating devices, limiting mechanism having operating elements, and means for communicating motion from the counter-actuating devices to said operating elements, of restricting devices having movable members for arrangement in the paths of said operating elements, and actuating devices for said members.

30. In a voting machine, the combination with counter-actuating devices, limiting mechanism having operating elements, and means for communicating motion from the counter-actuating devices to said operating elements, of means for controlling access to the counter-actuating devices, restricting mechanism having movable members for arrangement in the paths of said operating elements, and connections between said controlling means and the movable members for moving the latter to their operative positions when the former is moved to give access to the counter-actuating devices.

31. In a voting machine, the combination with counter-actuating devices, limiting mechanism having operating elements, and means for communicating motion from the counter-actuating devices to said operating elements, of means for controlling access to the counter-actuating devices, restricting mechanism having movable arms, and connections between said controlling means and the arms for moving the latter to their operative positions when access is given to the counter-actuating devices, said arms being provided with adjustable means for arrangement in the paths of said operating elements.

32. In a voting machine, the combination with counter-actuating devices, limiting mechanism having operating elements, and means for communicating motion from the counter-actuating devices to said operating elements, of means for controlling access to the counter-actuating devices and arms for movement toward and from said operating elements, and connections between said controlling means and the rock-shaft for moving the arms toward the operating elements when access is given to the counter-actuating devices, said arms having adjustable means for arrangement in the paths of the operating elements when the arms are moved toward the operating elements.

33. In a voting machine, the combination with counter-actuating devices, limiting mechanism having operating elements, and means for communicating motion from the counter-actuating devices to said operating elements, of means for controlling access to the counter-actuating devices, restricting devices having a rock-shaft, and arms for movement toward and from the operating elements, said arms having adjustable extensions for location in the paths of the operating elements when the arms are moved toward the latter, and connections between said controlling means and the rock-shaft for moving the arms toward the operating elements when access is given to the counter-actuating devices.

In testimony that I claim the foregoing as my own, I have hereto affixed my signature in the presence of two witnesses.

LENNA R. WINSLOW.

Witnesses:
 B. A. BRUCE,
 C. E. FOSTER.